US007134075B2

(12) United States Patent
Hind et al.

(10) Patent No.: US 7,134,075 B2
(45) Date of Patent: Nov. 7, 2006

(54) CONVERSION OF DOCUMENTS BETWEEN XML AND PROCESSOR EFFICIENT MXML IN CONTENT BASED ROUTING NETWORKS

(75) Inventors: John R. Hind, Raleigh, NC (US); Yongcheng Li, Raleigh, NC (US); Yih-Shin Tan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1033 days.

(21) Appl. No.: 09/843,198

(22) Filed: Apr. 26, 2001

(65) Prior Publication Data

US 2002/0161801 A1    Oct. 31, 2002

(51) Int. Cl.
G06F 17/00    (2006.01)
G06F 17/21    (2006.01)
(52) U.S. Cl. .................................... 715/513; 715/523
(58) Field of Classification Search ................ 715/513, 715/514, 523
See application file for complete search history.

(56) References Cited

U.S. PATENT DOCUMENTS

| | | | |
|---|---|---|---|
| 5,179,378 A | 1/1993 | Ranganathan et al. | 341/51 |
| 5,663,721 A | 9/1997 | Rossi | 341/51 |
| 6,209,124 B1 | 3/2001 | Vermeire et al. | 717/114 |
| 6,249,794 B1 | 6/2001 | Raman | |
| 6,330,574 B1 | 12/2001 | Murashita | 715/513 |
| 6,336,124 B1 | 1/2002 | Alam et al. | 715/523 |
| 6,430,624 B1 | 8/2002 | Jamtgaard et al. | 709/246 |
| 6,446,256 B1 | 9/2002 | Hyman et al. | 717/143 |
| 6,490,591 B1 | 12/2002 | Denbar et al. | 707/101 |
| 6,502,101 B1 | 12/2002 | Verprauskus et al. | 707/101 |
| 6,504,554 B1 | 1/2003 | Stone et al. | 345/760 |
| 6,593,944 B1 | 7/2003 | Nicolas et al. | 345/744 |
| 6,606,603 B1 * | 8/2003 | Joseph et al. | 705/26 |
| 6,643,652 B1 * | 11/2003 | Helgeson et al. | 707/10 |
| 6,675,351 B1 | 1/2004 | Leduc | 715/503 |
| 6,697,805 B1 | 2/2004 | Choquier et al. | 707/10 |
| 6,732,175 B1 * | 5/2004 | Abjanic | 709/227 |
| 6,804,677 B1 * | 10/2004 | Shadmon et al. | 707/101 |
| 2002/0099598 A1 * | 7/2002 | Eicher et al. | 705/11 |
| 2002/0143644 A1 * | 10/2002 | Tosun et al. | 705/26 |

(Continued)

OTHER PUBLICATIONS

Kotok, Alan, "Integrating SOAP into ebXML", Published on ITworld.com, Apr. 17, 2001, pp. 1-4 (downloaded from www.itworld.com/AppDev/1472/ITW010404ebXML/pfindex.html).*

(Continued)

Primary Examiner—William Bashore
Assistant Examiner—Robert M. Stevens
(74) Attorney, Agent, or Firm—Synnestvedt & Lechner LLP; Stephen Calogero, Esquire

(57) ABSTRACT

A method, system, and computer program product for efficient processing of Extensible Markup Language (XML) documents in Content Based Routing ("CBR") networks. Specifically, the method involves converting existing XML documents to a machine-oriented notation ("mXML") which is significantly more compact than XML, while still conveying the content and semantics of the data and the structure of the document. Documents are converted from XML to mXML upon entering a CBR subnetwork and/or upon receipt by an mXML-capable device. The documents are then processed in mXML format. Devices within the inventive system are provided with an awareness of whether target devices or processes are mXML-capable. Documents being routed to a target which is mXML-capable are passed in mXML format while documents being routed to a target which is not mXML-capable are converted to XML before they are passed.

30 Claims, 12 Drawing Sheets

U.S. PATENT DOCUMENTS

| | | | | |
|---|---|---|---|---|
| 2002/0143821 | A1* | 10/2002 | Jakubowski | 707/522 |
| 2002/0147823 | A1* | 10/2002 | Healy | 709/230 |
| 2002/0161688 | A1* | 10/2002 | Stewart et al. | 705/37 |
| 2002/0169788 | A1* | 11/2002 | Lee et al. | 707/104.1 |
| 2002/0184101 | A1* | 12/2002 | Gidadhubli et al. | 705/26 |
| 2003/0046316 | A1* | 3/2003 | Gergic et al. | 707/513 |
| 2003/0069975 | A1* | 4/2003 | Abjanic et al. | 709/227 |

OTHER PUBLICATIONS

Lear, Anne C., "XML Seen as Integral to Application Integration", IT Pro, Sep./Oct. 1999, pp. 12-16.*

Breissinger, Marc G., "B2B Standards: Foundation of Effective Trading Networks", Published in Dell Power Solutions, Issue 1, 2001, pp. 1-10 (downloaded from http://www.1.us.dell.com/content/topics/global.aspx/power/en/ps1q01_webmeth?c=us&cs=555&I=en&s=biz).*

"ebXML Initiative —An Update", Australian Customs OBS Division Electronic Commerce Section, May 30, 2000, pp. 1-18 (downloaded from www.wcoomd.org/ie/en/Topics_Issues/FacilitationCustomsProcedures/XML-Update.pdf).*

"XML and E-Commerce: Opportunities and Challenges", Harbinger Corporation, Mar. 14, 2000, pp. 1-18.*

2000 JavaOne Conference Home Page, Conference dates: Jun. 6-9, 2000, pp. 1-2, (downloaded from servlet.java.sun.com/javaone/javaone00/).*

Friedman, Richard, "The J2EE Platform and XML", 2000 JavaOne Conference, San Francisco, CA, Jun. 6-9, 200, pp. 2-4 and 38-47.*

Kassem, Nicholas, "XML Messaging & J2EE Technology", 2000 JavaOne Conference, San Francisco, CA, Jun. 6-9, 200, pp. 1-24.*

Hooker, Kristie, "Implementing an XML API for an n-tier eCommerce Application", Ecommerce Systems, Santa Clara, CA, Jun. 2000, pp. 1-6 (downloaded from www.infoloom.com/gcaconfs/WEB/paris2000/S21-03.HTM).*

Bodkin, Ron, "Using XML Effectively in eBusiness Architectures", C-bridge Internet Solutions, Cambridge, MA, Jun. 2000, pp. 1-15 (downloaded from www.infoloom.com/gcaconfs/WEB/paris2000/S21-02.HTM).*

He, Ning, et al., "B2B Contract Implementation Using Windows DNS", Australian Computer Science Communications, vol. 23 Issue 6, Jan. 2001, pp. 71-79 (plus citation page).*

Omelayenko, Borys, et al., "A Layered Integration Approach for Product Descriptions in B2B E-commerce", Division of Mathematics and Computer Science, Vrije University, Amsterdam, NE, created Apr. 20, 2001, pp. 1-7 (plus pdf properties page).*

"ebXML Transport, Routing & Packaging Messaging Service Specification", Working Draft, v0-21, OASIS, Sep. 13, 2000, pp. 1-33.*

"ebXML Technical Architecture Specification", OASIS, Aug. 31, 2000, pp. 1-80.*

Harold, Elliotte Rusty, XML: Extensible Markup Language, IDG Books Worldwide, Inc., Foster City, CA, ™ 1998, pp. 29-33, 69-70, 104-111 and 121-128.*

LaFore, Robert, et al., Data Structures & Algorithms in Java, Waite Group Press, Corte Madera, CA, ™ 1998, pp. 182-190, 293-299 and 328-339.*

Sturm, Jake, Developing XML Solutions, Microsoft Press, Redmond, WA, ™ 2000, pp. 105-122, 219-227, 231-249 and 371-384.*

Jaworski, Jamie, JAVA 1.1 Developer's Guide, 2nd Edition, Sams.net Publishing, Indianapolis, IN, ™ 1997, pp. 3-10, 75-77, 81-82 and 933-941.*

Java Apache Project, Cocoon, Copyright 1999, p. 1-9.

W3C Extensive Stylesheet Language (XSL) Version 1.0, Mar. 27, 2000, pp. 1-15.

The apache Software Foundation, Xalan-Java Version 1.2 D01, Jul. 25, 2000.

Jang, Hyunchul et al., An Effective Mechanism for Index Update in Structured Documents, Nov. 1999.

Yamamoto, Yohei et al., On Indicos for XML Documents with Namespaces, 1999.

"SML: Simplifying XML", by Robert E. La Quey, pp. 1-5, published on XML.com Nov. 24, 1999, <http://www.xml.com/print/1999/11/sml/ndex.html>.

* cited by examiner

FIG. 1
(PRIOR ART)

```
<NAMES>
<NAME>                              ← 105
<LAST_NAME>
Erwin                               ← 110
</LAST_NAME>                        ← 115
<FIRST_NAME>
Cody                                ← 120
</FIRST_NAME>                       ← 125
<MIDDLE_INITIAL />
</NAME>
<NAME>                              ← 130
<LAST_NAME SUFFIX = "Jr.">          ← 135
Curtis
</LAST_NAME>
<FIRST_NAME>
John
</FIRST_NAME>
<MIDDLE_INITIAL />
</NAME>
</NAMES>
```

```
<root element> 402
    <level_one_element1 id="1" name="1"> 410
        A<
        level_two_element11> B </level_two_element11><    412
        level_two_element12> C </level_two_element12>    414
    </level_one_element1><
    level_one_element2 id="2" name="2">    420
        D<
        level_two_element21> E </level_two_element21>    422
    </level_one_element2>
</root_element>
```

*460*

6(root_element;1,4;;)(level_one_element1;2,3;0.2.2.1,3.4.7.1;8,1)
(level_two_element11;;;9,1)(level_two_element12;;;10,1)
(level_one_element2;5;11.2.13.1,14.4.18.1;19,1)
(level_two_element21;;;20,1)id1name1ABCid2name2DE

*480*

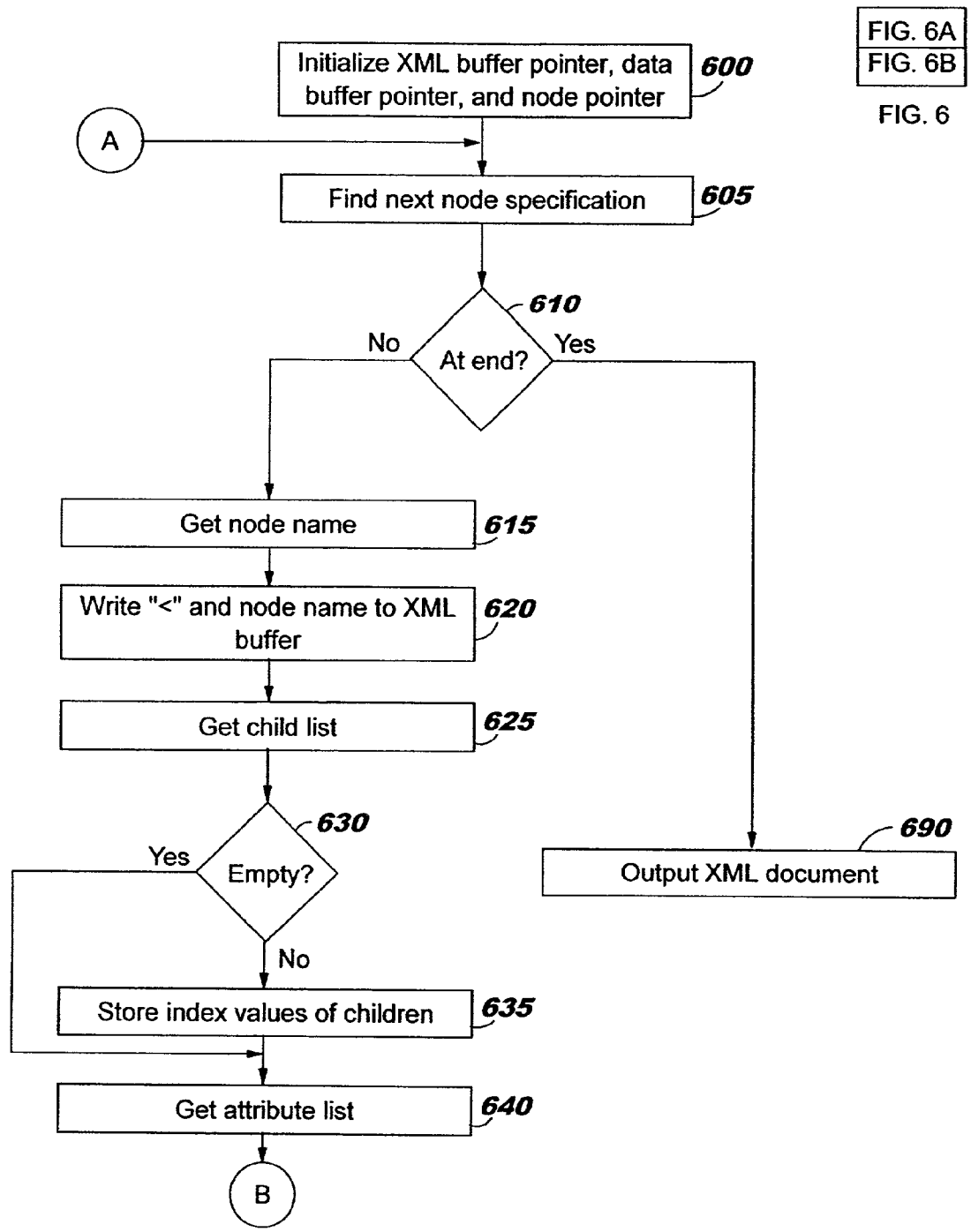

CONVERSION OF DOCUMENTS BETWEEN XML AND PROCESSOR EFFICIENT MXML IN CONTENT BASED ROUTING NETWORKS

BACKGROUND OF THE INVENTION

1. Related Applications

The present invention is related to U.S. Pat. No. 6,938,204, titled "Array-Based Extensible Document Storage Format" (application Ser. No. 09/652,296), and U.S. Pat. No. 6,941,511, titled "High-Performance Extensible Document Transformation" (application Ser. No. 09/653,080), and U.S. Pat. No. 6,904,562, titled "Machine-Oriented Extensible Document Representation And Interchange Notation" (application Ser. No. 09/652,056), each filed Aug. 31, 2000. These related inventions are commonly assigned to International Business Machines Corporation (IBM), and are hereby incorporated herein by reference.

2. Field of the Invention

The present invention relates generally to a network of computer systems which interchange data in eXtensible Markup Language (XML), and particularly to the use of a machine-oriented notation for representation and interchange of extensible documents ("mXML") in network devices, e.g. those network devices that perform Content Based Routing ("CBR") within a communications network. The mXML notation and a method, system, and computer program product for operation upon (e.g. parsing and storing) documents in mXML is set forth in U.S. Pat. No. 6,904,562, titled "Machine-Oriented Extensible Document Representation And Interchange Notation" (application Ser. No. 09/652,056) filed Aug. 31, 2000.

DESCRIPTION OF THE RELATED ART

Business and consumer use of distributed computing, also commonly referred to as network computing, has gained tremendous popularity in recent years. In this computing model, the data and/or programs to be used to perform a particular computing task typically reside on (i.e. are "distributed" among) more than one computer, where these multiple computers are connected by a network of some type. The Internet, and the part of the Internet known as the World Wide Web (hereinafter, "Web"), are well-known examples of this type of environment wherein the multiple computers are connected using a public network. Other types of network environments in which distributed computing may be used include intranets, which are typically private networks accessible to a restricted set of users (such as employees of a corporation), and extranets (e.g., a corporate network which is accessible to other users than just the employees of the company which owns and/or manages the network).

For business purposes, there are two main categories of network interactions between computing elements of distributed computing, those that connect users to business processes and those that interconnect the business process elements. An example of the first is the traditional Web whereby a user may use Web browser software to interact with business data and applications at a Web server using the HyperText Markup Language (HTML) data format transported by the HyperText Transport Protocol (HTTP). An example of the second is traditional "Electronic Document Interchange" (EDI) whereby documents such as requisitions, purchase orders, invoice, shipping notification, etc. existing in standardized electronic formats (such as ANSI X.12 or UN/EDIFACT) are moved between organizational processes by protocols such as X.400, SNADS, TMR, SMTP, etc. For these two categories of network interactions, there is a trend toward using the HTTP Web transport protocol and a common data format known as eXtensible Markup Language ("XML"). XML is a tag language, which is a language that uses specially-designated constructs referred to as "tags" to delimit (or "mark up") information. In the general case, a tag is a keyword that identifies what the data is which is associated with the tag, and is typically composed of a character string enclosed in special characters. "Special characters" means characters other than letters and numbers, which are defined and reserved for use with tags. Special characters are used so that a parser processing the data stream will recognize that this a tag. A tag is normally inserted preceding its associated data; a corresponding tag may also be inserted following the data, to clearly identify where that data ends.

The syntax of XML is extensible and flexible, and allows document developers to create tags to convey an explicit nested tree document structure (where the structure is determined from the relationship among the tags in a particular document). Furthermore, document developers can define their own tags which may have application-specific semantics. Because of this extensibility, XML documents may be used to specify many different types of information, for use in a virtually unlimited number of contexts. It is this extensibility and flexibility which is, in large part, responsible for the popularity of XML. (A number of XML derivative notations have been defined, and continue to be defined, for particular purposes. "VoiceXML" is an example of one such derivative. References herein to "XML" are intended to include XML derivatives and semantically similar notations such as derivatives of the Standard Generalized Markup Language, or "SGML", from which XML was derived. Refer to ISO 8879, "Standard Generalized Markup Language (SGML)", (1986) for more information on SGML. Refer to "Extensible Markup Language (XML), W3C Recommendation 10-February- 1998" which is available on the World Wide Web at http://www.w3.org/TR/1998/REC-xml-19980210, for more information on XML.

FIG. 1 provides a simple example of prior-art XML syntax for a document 100 that may be used for specifying names (for example, names of the employees of a corporation, the customers of a business, etc.). In this example, a <LAST_NAME> tag pair 105, 110 is used to represent information for a last name, and a <FIRST_NAME> tag pair 115, 120 is used to represent information for a first name. The data content values for the last name and first name then appear (as a string, in this case) between the opening and closing tags. The <MIDDLE_INITIAL/> tag 125 in this case uses a short-hand empty tag format where the tag name of a tag having no data content is followed by a closing tag symbol "/>". XML tags may also contain attribute names and attribute values, as shown by the 'SUFFIX="Jr."' attribute 135 specified within the opening <LAST_NAME> tag 130. As can be seen upon inspection of this document 100, the entire data content of this example comprises 22 characters. The tag syntax, however, adds another 201 printable characters (not including tabs, line returns, blanks, etc.), or approximately 90 percent of the total document file size. In the general case, the overhead in terms of characters used for the tag syntax could be even higher, as the tag names might be even longer than those shown. In addition, the data content specified in this example as an attribute (shown at 135) could alternatively be represented as an element within its own opening and closing tag pair, leading to an even greater amount of tag-related overhead.

Although XML is an excellent data format, the parsing, manipulation, and transformation of XML documents involves a considerable amount of overhead. The extensible tag syntax enables an XML document to be easily human-readable, as the tag names can be designed to convey the semantic meaning of the associated data values and the overall relationship among the elements of the data. For example, in FIG. 1 the tag names and structure explicitly show that a name includes a last name, a first name, and a middle initial. This human-friendly, well-structured format enables a human being to quickly look through an arbitrary XML document and understand the data and its meaning. However, it will take a computer quite a lot of effort to understand the data and do useful things with it. The raw content of most XML documents will never be seen by a human: instead, what the end user sees is typically created using a rendering application (such as an XML parser within a browser) which strips out the tags and displays only the embedded data content. The added overhead of the human-friendly tag syntax therefore leads to unnecessary inefficiencies in processing and storing structured documents when the documents will only be "seen" by a computer program, such as for those documents which are formatted for interchange between computer programs for business-to-business ("B2B") or business-to-consumer ("B2C") use.

Applicants have previously developed a machine-oriented notation for use as an XML alternative. The machine-oriented notation improves processing time for arbitrarily-structured documents and reduces the storage requirements and transmission costs of data interchange while still retaining the extensibility and flexibility of XML and while conveying equivalent content and semantic information. This machine-oriented notation is referred to herein as "mXML". U.S. Pat. No. 6,904,562, titled "Machine-Oriented Extensible Document Representation And Interchange Notation" (application Ser. No. 09/652,056), filed Aug. 31, 2000 discloses the mXML notation, as well as a method, system, and computer program product for operating upon (e.g. parsing, and storing documents in) mXML.

This machine-oriented notation may be used within a product boundary, enabling (for example) mXML documents to be shared among different processing components, transferred from one storage medium to another (such as between memory and disk), and so forth. Methods of conducting e-commerce or e-business are also facilitated when documents are encoded in mXML, as those documents may be efficiently exchanged among business partners, within different locations of an enterprise, etc.

For both categories of network interaction, an efficient interaction is sought between the elements involved in active network routing of messages and/or requests, e.g. based on application layer control information or data. One approach to such efficient interaction has been termed "Content Based Routing" (CBR). CBR allows for optimizations involving load distribution, resolution of quality of service issues, distributed application and data affinity, efficient solution of security issues, and efficient representation of business process policy. For example, CBR can be used to ensure that data requests flow in a direct way to the best application process that matches the required application characteristics, e.g. to ensure routing of a purchase order to a sales office order fulfillment system associated with a customer's sales representative, or to ensure routing of a credit card transaction to a bank system associated with a respective credit card account number. A common characteristic of a CBR network is that the ultimate target of a data request is unknown at the point where the request enters the CBR network, and that the ultimate target becomes clearer as the request moves through the network and is not resolved absolutely until the request reaches the target system.

Various programming methods, hardware and software for implementing CBR are well known in the art. Typical techniques for CBR, when used to connect users to business processes via the Web, include scanning, reading and/or extracting a small amount of data from a document or the application protocol control parameters which transport it, such as the HTTP headers of a Web request. Such data is then used for routing purposes. For non-XML documents, e.g., an HTML form document, such data may typically be found in the first few packets of a session where other application layer control information is often found. For example, the data of a user-completed HTTP form is often found encoded in a URL string of the HTTP GET command header of a Web request which sends this form data to a Web server.

For many other traditional Web requests, application data such as cookies may be extracted from GET Web request HTTP headers which identify a URL, etc. being retrieved. With such a request, there is no document associated (transmitted) as part of such a request; thus, to perform CBR in such cases, one need examine only the GET and/or other HTTP command header information, not an entire document. Accordingly, such routing data may be easily and efficiently found, without significantly burdening a CBR-capable network device.

Typical CBR techniques used to interconnect business process elements use application agents to decode application parameters. Such application parameters represent the routing-relevant portion of the content which has been extracted from the transported application message (document) and placed in an easily accessible part of the protocol header. An exemplary technique is disclosed in U.S. Pat. No. 5,563,878 to Blakely et al. Such techniques limit the required depth of content scanning at each routing location along the path of the request. This means that routing nodes often contain application-specific code and that the source process in a flow has to be aware of the availability and details of agents within the transport network. Additionally, the routing data may be easily and efficiently found, without significantly burdening a CBR-capable network device.

In a network of CBR-capable nodes where XML documents are routed without the use of application-specific agents resident in the respective nodes, the routing requirements are often specified as a set of rules which are stored in a repository such as an LDAP directory which are retrieved by the CBR-capable device and executed using generic code to determine the next "hop" that a respective incoming XML document should take. For example, consider a rule having logic "IF (condition) THEN (next hop)" where the '(condition)' is an expression which test various structural and/or data states within the XML document. Often the XML Path Language (XPath) is used within the expression to identify parts of the XML document which are being tested (for detailed information on XPath see "XML Path Language (XPath) Version 1.0" W3C Recommendation 16 November 1999 found at http://www.w3.org/TR/1999/REC-xpath-19991116 ) and it models an XML document as a tree of nodes. This means that the CBR-capable device must be capable of such an internal representation of the XML document being routed to apply such rules. For example, a rule having a high level form of "IF (purchase order has some expedited items) THEN (forward to Chicago)" might have a detailed expression which contains an XPath fragment that looks like "//item[descendant::delivery_options[@expedite='yes']]" which identifies all 'item' elements in the document node tree having a descendant element named 'delivery_options' with an attribute named 'expedite' that has a value of 'yes'.

Because there is a trend toward using HTTP as a transport protocol to move XML documents between business processes, there is now a need for a CBR network device capable of applying XML content based routing rules to HTTP PUT or POST Web requests. PUT and POST requests are used to send XML documents to a server where the included URL is often the designator of an application process which should be invoked to process the document. With such requests, an XML document is part of the inbound Web request and information useful for CBR may be located anywhere within the XML document, as seen from the exemplary Xpath fragment above. Accordingly, CBR of XML documents often requires treating the entire XML document as a tree of nodes to extract information useful for routing. Therefore, the routing device must buffer, parse and scan deep into a datastream until it can be determined where the request is to be next routed/sent. This creates a significant amount of processing overload and heavily burdens the network devices, such as routers and switches, that perform the CBR functions. This results in significant degradation of performance of such devices and therefore the network generally. As XML is increasingly used to represent data in business-to-business ("B2B"), application-to-application, and other scenarios, CBR devices and associated networks are being significantly overburdened.

Accordingly, what is needed is an efficient method of extracting routing information from XML documents, a means of passing this extracted information to other network devices, nodes or processes, and/or a means of offloading application server XML processing overhead.

SUMMARY OF THE INVENTION

The present invention provides a method for efficient processing of, e.g. buffering, parsing, transmission, routing, and extraction of data from, XML documents, e.g. by CBR devices, as such documents flow across a network. The present invention provides a method which uses efficient mXML machine-oriented notation. The present invention not only provides better performance within the network but also provides an offloading of processing overhead when XML documents are sent to an mXML-capable device by way of a CBR networking device in accordance with the present invention.

In accordance with the present invention, an XML document is converted to mXML upon receipt by an mXML-capable device, e.g. a CBR-capable router in a CBR sub-network. The mXML document is then processed by the device, thereby realizing processing efficiencies. Devices within the inventive system are provided with an awareness of whether target devices or processes are mXML-capable. A target to which the processed output document will be next routed is identified. It is then determined whether the target is capable of processing documents encoded in mXML. If the target is capable of processing mXML, the mXML document is passed to the target so that the target can process the document in mXML and realize processing efficiencies, without the need to convert from XML to mXML. This effectively offloads processing from the target, namely, by providing the document to the target in mXML format, rather than requiring the target to process the document to convert from XML to mXML. If the target is not capable of processing documents in mXML, the mXML document is converted to XML before being passed to that target.

A system and computer program product for carrying out the inventive method are also provided.

BRIEF DESCRIPTION OF THE DRAWINGS

FIG. 1 illustrates an exemplary document using the XML notation of the prior art;

FIGS. 4A through 4C illustrate a simple structured document created in existing XML notation, a tree structure representing the structure and data content of this prior art XML document, and an equivalent structured document represented in mXML notation, respectively;

DESCRIPTION OF THE PREFERRED EMBODIMENT

The present invention provides a method and apparatus for efficient processing of XML documents, e.g. by CBR devices, using a machine-oriented notation, namely mXML. The mXML notation and a method, system, and computer program product for operation upon (e.g. parsing and storing) documents in mXML is described in detail in U.S. Pat. No. 6,904,562, titled "Machine-Oriented Extensible Document Representation And Interchange Notation" (application Ser. No. 09/652,056) filed Aug. 31, 2000. So that the present invention may be more readily understood, a discussion of mXML and conversion between XML and mXML is excerpted and/or adapted therefrom and provided below in discussion of FIGS. 4–9.

Figure 2:
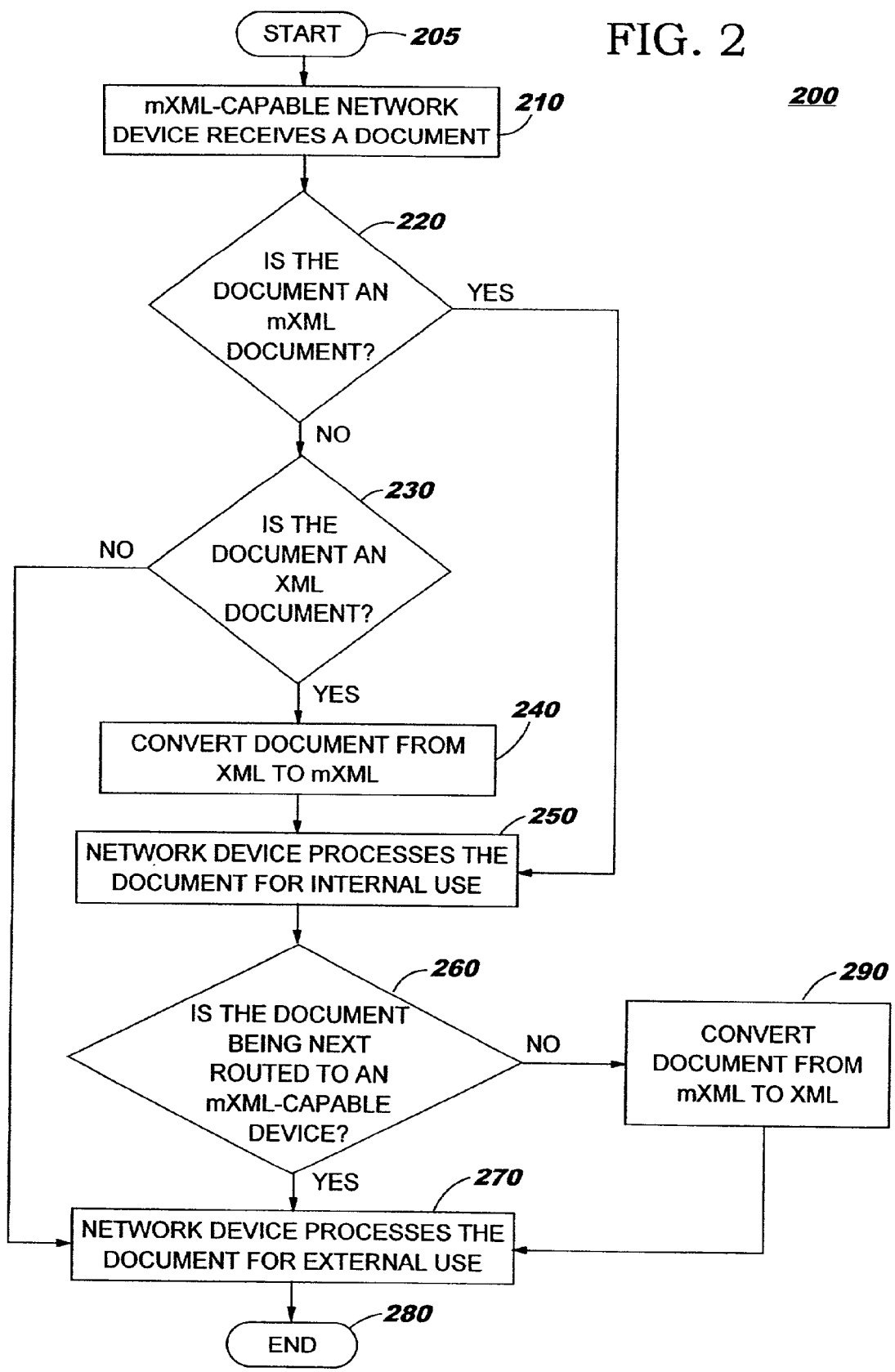
FIG. 2 provides a flowchart which sets forth the logic for processing documents in accordance with a preferred embodiment of the present invention.
Figure 3:
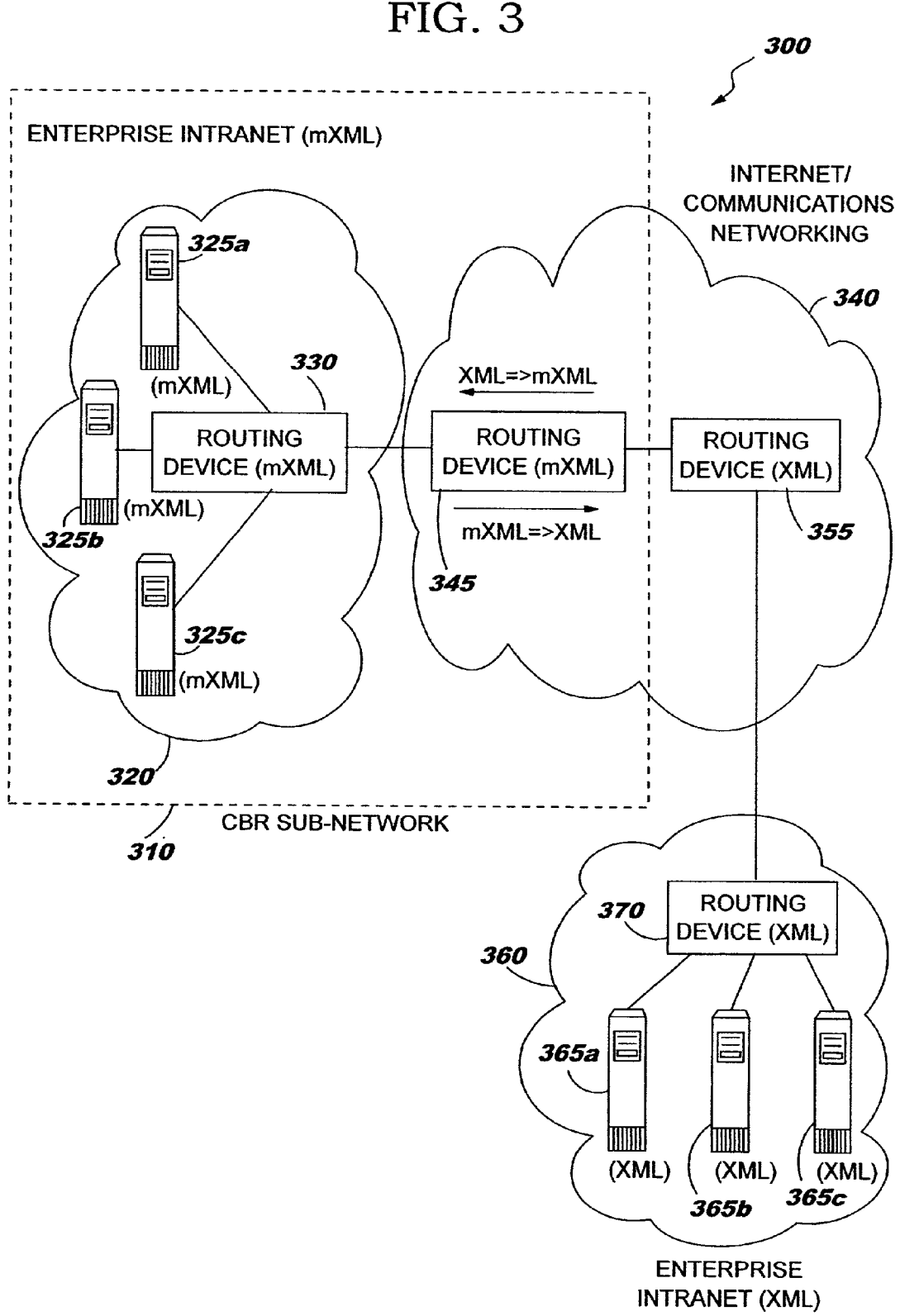
FIG. 3 is a diagram of an exemplary networked computing environment in accordance with the present invention.

FIG. 2 provides a flowchart 200 which sets forth logic for processing an XML document in accordance with a preferred embodiment with the present invention. FIG. 3 is a diagram of an exemplary networked computing environment including an exemplary network device 345 in accordance with the present invention, namely an mXML-capable router. Network device 345 is "mXML-capable" in that it is capable of understanding and/or processing mXML notation, e.g., reading, parsing, converting etc. Network device 345 is also "CBR-capable" in that it is capable of performing content-based routing decisions based on the content, e.g. IF (purchase order has some expedited items) THEN (forward to Chicago). Specifically, device 345 is capable of performing CBR of an mXML document.

For example, CBR-capable network devices may include routers, switches, load balancers, proxies, caches, TCP shapers, etc. In accordance with the present invention, such devices may be configured as mXML-capable. For illustrative purposes, FIGS. 2 and 3 are discussed herein below from the perspective of an exemplary mXML-capable, CBR-capable router device 345. Programming techniques for configuring an mXML-capable device to perform CBR as a function of mXML are straightforward and/or well known in the art since the mXML runtime processing environment supports the same access functions as does the XML runtime processing environment.

In the example of FIGS. 2 and 3, the network device (router) 345 is capable of converting documents from XML to mXML and from mXML to XML. Accordingly, the network device 345 stores software or instructions for carrying out conversion methods from XML to mXML and vice versa. Such conversion methods are disclosed in detail in U.S. Pat. No. 6,904,562, titled "Machine-Oriented Extensible Document Representation And Interchange Notation" (application Ser. No. 09/652,056), filed Aug. 31, 2000, and are discussed further below with reference to FIGS. 5 and 6.

As shown in FIG. 2, the inventive method starts with the network device's receipt of a document for routing to a destination/host, as shown at steps 205, 210. For example, such a document may represent a credit card transaction being sent from B2B enterprise application server 365*b* of XML-based enterprise intranet 360 via XML-capable routing device 370 (that is, a device which is XML-capable but not mXML-capable). In this example, the document is received by XML-capable, CBR-capable routing device 355 of Internet/communications network 340. The document is then routed to router device 345, which is within the CBR sub-network 310. In the example of FIG. 3, all devices within CBR sub-network 310 are CBR-capable and mXML-capable.

The network device 345 next determines whether the document is a document encoded in mXML (an "mXML document"), as shown at step 220. This is performed by software stored on the network device 345. Programming methods and techniques for carrying out this step are straightforward. For example, if HTTP is being used as the transport protocol, then the "message" header fields of the protocol describe the transported document format and can be examined to make this determination. In the example of FIG. 2, consider that the document representing a credit card purchase transaction sent from enterprise application server 365*b* is encoded in XML. Accordingly, the test of step 220 is answered in the negative.

As shown at step 230 in FIG. 2, it is next determined whether the document is an XML document. Programming methods and techniques for carrying out this step are well known in the art. In the exemplary credit card transaction described above, this test has a positive result.

A document represented using the mXML notation can be processed much more efficiently than when using the existing human-friendly (but processor unfriendly) XML notation. Particularly, a document represented using the mXML notation requires much less storage space, and has a significantly lower transmission cost for data interchange (for example, from one computing device to another across a network). Accordingly, because network device 345 is mXML-capable, network device 345 converts the XML input document to an output document encoded in the in-memory array mXML notation, as shown at step 240 in FIG. 2. A method for converting an XML document to an mXML document is disclosed in detail in U.S. Pat. No. 6,904,562, titled "Machine-Oriented Extensible Document Representation And Interchange Notation" (application Ser. No. 09/652,056), filed Aug. 31, 2000 and is discussed below with reference to FIG. 5.

The output document is then processed for internal use by the network device as shown at step 250. Step 250 includes parsing of the line format mXML document from step 220 "yes" into a memory array mXML representation (the same form that results from step 240). A method for parsing an mXML document disclosed in detail in U.S. Pat. No. 6,904,562, titled "Machine-Oriented Extensible Document Representation And Interchange Notation" (application Ser. No. 09/652,056), filed Aug. 31, 2000 and is discussed below with reference to FIG. 7. This step may also include additional optimization processing steps such as locating or building an envelope-like data structure that provides high-speed access to the content information need to evaluate the routing rules.

It is then determined whether the document is going to be next routed to an mXML-capable device, i.e. a device capable of interpreting and/or processing (collectively "processing") documents encoded in mXML, as shown at step 260. For this purpose, devices within the inventive system are provided with an awareness of whether target devices or processes are mXML-capable, as discussed below. This device is the next routing target. Because mXML is useful within a product or software application boundary, a "target" to which the document will be next "routed" may include a next process, software subroutine, etc. to which the documents will be passed and therefore may not require network transmission. For example, the logic of FIG. 2 may be incorporated in an mXML supportive application process, such as a credit authorization agent. In such an example, the incoming document may be a request to authorize a credit card charge represented in memory as an mXML array data structure in step 250. The document is then passed to the local application logic which after performs its function, such as verifying that the cardholder's outstanding balance is within certain limits and that the card has not been reported stolen, etc., and then transforms the document and the protocol header information into a response to be sent, e.g. a credit declined message.

In the example of FIGS. 2 and 3 involving router device 345, step 260 includes identifying the next hop in the routing path for the document. For example, this step may include the step of identifying a CBR target, e.g. a router, switch, load balancer, proxy, cache, TCP shaper, etc., e.g. by host name string or IP address, to which the request will be forwarded, and then referencing a directory to determine whether that device has registered characteristics which include mXML processing capabilities. Alternatively, the characteristic of mXML processing capability may be included within the data that is currently transmitted within certain routing protocols that move topology and cost information between network devices.

Step 260 also includes determining whether the identified target is capable of processing a document encoded in mXML (an "mXML document"). For example, this may be achieved by referencing a datastore of data identifying a plurality of targets, e.g. router or switch, e.g. by IP address, and indicating whether each of the plurality of targets is capable of processing mXML documents. Such information may be obtained, for example, by referencing an LDAP directory or other repository or by using a protocol to exchange characteristic information within the target system (for example, through a Simple Network Management Protocol (SNMP) request for a Management Information Base (MIB) that contains the characteristic. Such directories, repositories and protocols currently exist but be modified in accordance with the present invention to indicate whether a target is mXML capable. In one embodiment, whether a device is mXML capable may be learned, e.g. upon receipt of an mXML document from a device, and remembered, e.g. by making an appropriate entry in the LDAP directory. Whether a target is mXML-capable may be indicated, for example, as an attribute in a directory entry that describes the target. The datastore may be stored in a distributed fashion, e.g., in a memory at each network device, or in a centralized fashion, e.g., in a memory at a network-accessible repository. Such mXML-capability information may optionally be exchanged and propagated between network devices, e.g. by each mXML-capable device communicating its mXML processing capability to every other device it communicates with, etc. Programming techniques for carrying out these steps are well known in the art.

If the document is to be next routed to an mXML-capable device, it is advantageous to keep the document in mXML stream format for efficient further processing. Accordingly, the mXML in memory array representation is serialized to wire format as it is transmitted to the next hop device. For example, in a CBR environment, the document may be scanned multiple times, e.g. once by each CBR device within the CBR sub-network. Each device may be scanning for different content information for routing purposes. If each device is mXML-capable, the multiple scanning can be done efficiently by each device, which can significantly lessen network burdens.

Accordingly, if the document is being next routed to an mXML-capable device in step 260, the document is processed as is generally known in the art and the method ends, as shown in steps 270 and 280. This processing step 270 may include any processing step known in the art for such network devices, e.g. simple routing of the document to its next hop and/or its intended destination. In the example of a router network device, this processing step may include routing the document to a target node in accordance with content based routing information extracted from the document, e.g. including transmitting the mXML document to the target node. This is particularly advantageous because the next mXML-capable device will be able to process the mXML document efficiently, as described above, without the need to convert from XML to mXML. In this manner, an offload of processing from XML to mXML is achieved, thereby decreasing the processing burden of the offloaded target.

In the example of FIG. 3, the XML document coming from routing device 355 will be next routed to routing device 330 of mXML-capable enterprise intranet 320 from routing device 345. For example, the XML credit card authorization transaction document originating from a retail store chain's enterprise intranet application server 365*b* is sent to a credit card clearing network, e.g. network 340, and arrives at the XML-capable (not mXML-capable) CBR routing device 355 which uses prior art techniques to decode the brand of credit card involved. Device 355 then forwards the XML document to the mXML-capable CBR routing device 345 which converts the XML document to mXML. Device 345 then applies rules to the detailed description of the purchase involved and determines that this transaction exceeds the limit set by the brand for automated clearinghouse processing and forwards the mXML request to the regional bank associated network, e.g. enterprise intranet 320's mXML-capable routing device 330. Device 330 then uses the credit card number to determine that the account resides on a bank's mXML-capable enterprise intranet server 325*b*. Device 330 then forwards the mXML document to server 325*b* which performs the authorization check.

In this scenario, router device 345 benefitted from the conversion of the XML document to the mXML in-memory array representation because of the memory management efficiency of using array storage rather than linked objects to represent the DOM tree from which the purchase details where extracted to evaluate the CBR rules being applied. Device 330, in addition to the efficiencies noted for router device 345, also benefitted from the less complex parsing involved in reading the mXML stream document into the mXML array in-memory representation (since router device 345 recognized that device 330 was mXML-capable and forwarded the document in mXML stream format). Finally, the mXML-capable enterprise application server 325*b* benefitted from the parsing efficiencies of mXML documents, meaning that in accordance with the present invention routing device 345 effectively offloaded the XML parsing overhead from application server 325*b* in this example.

If the document received in step 210 is an mXML document, as determined in step 220, the mXML-capable network device 330 processes the document for internal use, as shown at step 250 and as described above. This allows for efficient mXML-based processing at network device 345. The method then continues from step 260 as described above.

In the example of FIG. 2, if the document received in step 210 is determined not to be an mXML document in step 220, and determined not to be an mXML document in step 230, e.g., it is an HTML document, then the document is simply processed in step 270 as is known in the art, and the method ends, as shown at step 280.

If it is determined in step 260 that the document is not being next routed to an mXML-capable target, i.e. to a device or process incapable of interpreting, parsing and/or otherwise processing mXML, the document is converted from mXML to XML, as shown at step 290. In other words, the mXML in memory array information is serialized in step 290 into XML format, and is then transmitted to the next hop in step 270. This is necessary for the target to process the document because the target is not mXML-capable.

For example, consider an mXML document sent from server 325*b* of FIG. 3, which is mXML-capable and within the CBR sub-network 310, to server 365*b*, which is not mXML-capable and is outside the CBR sub-network 310. When routing device 345 determines that the mXML document will be next routed to routing device 355, which is not mXML-capable (as determined as described above in reference to step 260), it converts the document from mXML to XML before processing the document for external use, e.g. before routing the document to routing device 355. It should be noted that some processing of the mXML document may be performed by mXML-capable device 345 before the document is converted in step 290 and processed/transmitted to routing device 355 in step 270. A method for converting a document from mXML to XML is disclosed in detail in U.S. Pat. No. 6,904,562, titled "Machine-Oriented Extensible Document Representation And Interchange Notation" (application Ser. No. 09/652,056), filed Aug. 31, 2000 and discussed below with reference to FIG. 6.

In this manner, XML documents are converted to the relatively compact, memory buffer efficient, mXML format and processed in mXML format as much as possible, while recognizing that not all network devices/targets are mXML capable, and providing for processing of documents by such devices/targets in XML format where necessary. This enables efficient content based routing by network devices. Specifically, the present invention reduces the processing overhead associated with scanning of an entire XML document for routing purposes, rather, the data in an mXML document is formatted to provide for easy extraction and for efficient in-memory representation during internal processing steps. Additionally, the present invention allows for passing of this extracted routing information to other mXML-capable network devices, which may then use such information efficiently. Additionally, this effectively offloads application server XML processing overhead for mXML-capable devices such as application servers because the document has already been converted to mXML before reaching the mXML-capable device.

An optional optimization may be performed in step 250 of FIG. 2 to allow an mXML-capable device to annotate the virtual envelope of the respective application transport protocol and/or content stream with content data of potential interest to other nodes in the CBR network. Using this technique, when the CBR rule set for a particular document type contains simple content references, performance can be improved by eliminating the need to look inside the document at subsequent CBR nodes. For example, in the XML credit card authorization transaction flow described above with respect to FIG. 3, device 330 used a single data item, namely the credit card number, to decide where to send the transaction/document. The CBR processing at device 330 may be further optimized by eliminating the need to look inside the mXML document being routed, by configuring mXML device 345 to implement the optional optimization in step 250 by extracting the credit card number and using this information to annotate the virtual protocol envelope so that device 330 can make its routing decision by looking only at the envelope annotation and not at what is inside of the envelope. In an example using an HTTP transport (protocol envelope), the annotation for this example might be a cookie in the HTTP header fields, with the credit card number included as a value. In this case, device 330 needs to only look at this cookie "annotation" to decide to send the credit card authorization request to application server 325*b*, thereby avoiding looking inside of the mXML document. It should be noted that device 330 must still perform the step 260 shown in FIG. 2 and be able to convert the document to XML format if the next hop/target is not mXML capable.

A preferred embodiment of the present invention may be more readily understood in view of the discussion below with references to FIGS. 4–9, which illustrate in detail the mXML notation, XML to mXML and mXML to XML conversion methods, and other operations upon documents in mXML, as set forth fully in U.S. Pat. No. 6,904,562, titled "Machine-Oriented Extensible Document Representation And Interchange Notation" (application Ser. No. 09/652,056) filed Aug. 31, 2000.

The mXML Notation

Figure 4B:
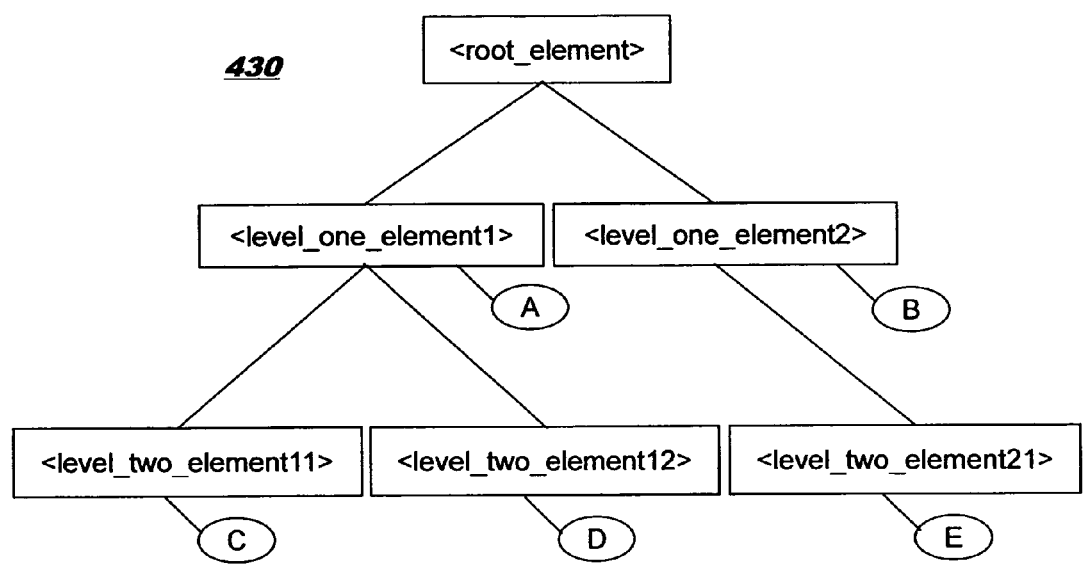

FIG. 4A illustrates a simple structured document 400 which is represented in the existing XML notation. This document contains 6 elements which are organized in a 3-level hierarchy. The node having element name "root_element" 402 is the root node, being at the highest level of the hierarchy. This node has 2 child nodes, having element names "level_one_element1" 410 and "level_one_element2" 420. Node "level_one_element1" 410 also has 2 child nodes, which are the nodes having element names "level_two_element11" 412 and "level_two_element12" 414, and node "level_two_element2" 420 has a single child node having element name "level_two_element21" 422. A tree structure 430 representing document 400 is shown in FIG. 4B, where the tags for the 6 elements are depicted inside rectangular shapes representing nodes of the tree and the data content corresponding to each node is shown inside an ellipse. This interpretation of an XML document 400 and its corresponding tree structure 430 are well known in the art.

Figure 4C:

FIG. 4C illustrates a structured document 460 using a preferred embodiment of the syntax of the mXML notation, representing the same information as XML document 400 of FIG. 4A (and having the same tree structure as that shown at 430 in FIG. 4B). This mXML document 460 uses 216 characters, whereas the equivalent XML document 400 uses 273 characters. (In addition, it should be noted that XML document 400 also includes approximately 23 additional non-printing characters (such as spaces, tabs, and line returns), for a total of 296 characters.) There may be isolated instances where use of mXML will increase the number of bytes required to store a structured document, as compared to the existing XML notation. However, this increase in character count is expected to be extremely rare in actual practice, and will occur only when tag names are extremely short. It is therefore expected that the majority of XML documents will require less space when represented in mXML.

The mXML notation is designed to represent an XML document in such a way that a computer can quickly and efficiently scan through the document, and can also manipulate it efficiently. Documents may therefore be created directly in, and used in, their mXML format. On the rare occasions when a human must see the document in a human-friendly form (for manual editing or other purposes, for example), a relatively small amount of overhead will be incurred to perform a conversion from mXML to XML. Documents which have been created in the existing XML syntax may be more efficiently processed and/or stored by converting them to mXML.

Advantages of the mXML notation include the following:

1) The data content is separated from the document structure, rather than being intermingled within the structure as in the existing XML notation. In the example of FIG. 4, the data content comprises the element values A, B, C, D, and E; the attribute names "id" and "name" (for the element shown at 410), and "id" and "name" (for the element shown at 420); and the corresponding attribute values 1, 1, 2, and 2. FIG. 4A shows how this information is located throughout the XML document 400 in the prior art. In FIG. 4C, on the other hand, these values are stored at the end of the mXML document, beginning at the position indicated with reference number 480. When a parser operates on a document (such as document 400 or 460), it is interested primarily in the document structure. The processing of the data content in an mXML document can therefore be delayed to the time when it is needed, and thus the separation of data structure and data content which is provided in mXML enables parsers to operate more efficiently.

2) The document tree structure is stored explicitly in the document when using mXML, rather than requiring the parser to deduce the document structure using look-ahead techniques as is required when XML tags of the prior art are parsed. Thus, a parser operating on an mXML document does not need to learn how to construct the document tree, and a number of compute-intensive operations can therefore be eliminated. Instead, the mXML parser merely scans the mXML document and rebuilds the tree according to the explicit, already-stored information (as will be described in more detail below).

3) Important information which is required for operation of the mXML parser is stored in advance within the mXML document, so that the parser can minimize its memory operations when constructing a corresponding document tree. In particular, the node count is precomputed and stored in the mXML document. According to the preferred embodiment of the mXML notation, this value is stored at the beginning of an mXML document. (In an alternative embodiment, the size of the data content is also precomputed and explicitly stored. In addition or instead, the starting location within the document of the data buffer may be explicitly stored if desired, enabling direct access to the data buffer without requiring additional processing such as the backward scanning process described below with reference to FIG. 7.) Thus, the parser can allocate most of the memory it needs at the beginning of its operation, thereby reducing the number of computationally expensive memory allocation (and de-allocation) operations it must perform. Furthermore, the high cost of garbage collection operations that occur when memory is being allocated and de-allocated frequently can be minimized.

As has been stated, an mXML document preferably begins with an integer count of the number of nodes or, equivalently, the number of tag names which are represented in the document. When converting an XML document into mXML, this count is easily determined by scanning for occurrence of the opening tag syntax.

Preferably, the node count does not include opening comment tags, and comment text is preferably discarded during such a conversion as the comments are generally not useful for the machine to which an mXML document is targeted. Other tags which are significant, on the other hand, such as a tag which identifies the Document Type Definition ("DTD") to be used for a particular document, may be included in the mXML notation by searching for appropriate keywords in such tags and preserving the located comment during a conversion from XML to mXML. A preferred technique for handling tags of this type is described in more detail below, prior to the discussion of FIG. 7.

In the alternative embodiment where the data size is also explicitly stored in the document, this integer value preferably follows the node count, using a suitable delimiter such as a semi-colon. The integer data count in this alternative embodiment preferably includes the number of characters in each attribute name and each attribute value, and in each node's data value, as these items are all stored as the document's data buffer area (i.e. the end of the mXML document).

One or more node specifications follows the node count. Each node specification is preferably enclosed in opening and closing delimiters, such as the parentheses which are used in the preferred embodiment. (Thus, it is not necessary to follow the node count with a separate delimiter.) Alternatively, another syntax could be used for opening and closing delimiters, such as opening and closing square brackets. Preferably, no spaces occur between the delimiters or tokens used in mXML, as shown in FIG. 4C. This enables minimizing the storage and transmission requirements. Thus, the node count is immediately followed by the first delimiting open parenthesis, which is immediately followed by the first node name, and so forth.

The elements contained within a node specification according to the preferred embodiment of the mXML syntax will now be described. It should be noted that the order of these elements may be altered without deviating from the inventive concepts disclosed herein.

The node specification of the preferred embodiment begins by explicitly recording the node name (i.e. its tag value). This name is then followed by a delimiter, which is a semi-colon in the preferred embodiment. A list of the node's child nodes follows this delimiter, and this child list is then followed by another occurrence of the delimiter and a list of the node's attribute information. The attribute information is followed by the delimiter, which is followed by information that enables locating the node's data content. (Alternatively, the meaning of the delimiters used in the preferred embodiment can be changed, for example by using a comma in place of the semi-colon delimiters of the preferred embodiment and vice versa.)

The information in the node specification will now be described in more detail with reference to the example of FIG. 4. The node shown at 402 of FIG. 4A has 2 child nodes, shown at 410 and 420. The node shown at 410 is the second of the 6 nodes of the example, and the node shown at 420 is the fifth node. The preferred embodiment uses zero-based counting (except for the node count which has been described), and thus the child list for the node shown at 402 is specified using the syntax "1,4" (referring to the 2nd and 5th nodes) to indicate the relative position of this node's children within the overall tag sequence. The node shown at 410 has 2 child nodes, shown at 412 and 414, which are the third and fourth nodes in the XML document. The child list for the node shown at 410 is therefore specified as "2,3". If a node has more than 2 children, the child nodes are specified in the order they appear in the document and are separated (in the preferred embodiment) with commas. If a node has no children, as is the case with the node shown at 412, for example, then its child list is empty and the absence of children is indicated by the presence of 2 semi-colons in a row immediately following the node name.

The information for each attribute in the attribute list is also preferably delimited using a comma. Within each attribute's information, a period is preferably used as a delimiter. Referring to the example in FIG. 4A, node B1 has 2 attributes. The first has the attribute name "id" and the attribute value "1". Thus, the length of the attribute name is 2, and the length of the attribute value is 1. Again using zero-based counting, the first attribute represented in the attribute list for the node shown at 410 is therefore specified as "0.2.2.1", meaning that the name of the attribute is found in the data buffer starting at position 0 for a length of 2 characters, and the value is found starting at position 2 for a length of 1. As shown in FIG. 4C, the data buffer is preferably stored at the end of the mXML document. A parser can therefore avoid scanning these characters during the parsing process when they are not needed.

The second of B1's attributes in this example has the name "name" and the value "1". The information for this second attribute is therefore specified using the syntax "3.4.7.1", meaning that the attribute's name is found in the data buffer starting at position 3 for a length of 4 characters and its value is found starting at position 7 for a length of 1. If a node has more than 2 attributes, this dot-delimited syntax is used for each such attribute, and is separated from the other attribute specifications for this node using commas as delimiters. As with the child list syntax, if a node has no attributes, the absence is indicated by specifying an empty attribute list.

While the syntax used in this embodiment refers to the data buffer using starting positions and length values, as described for the attribute names and values of the node at 412, in an alternative syntax the starting and ending positions within the data buffer may be used. Thus, the specification for the first attribute of the node at 412 would be expressed as "0.1.2.2", meaning that the attribute name begins at position 0 and ends at position 1, and the attribute value begins and ends at position 2. Similarly, the specification for the second attribute would be expressed as "3.6.7.7". Use of length values, as selected for the syntax of this embodiment, will in general require slightly less space than use of ending positions.

The final entry in each node specification is the location of the node's data in the data buffer. As with the other entries which refer to the data buffer, this location is preferably specified as a starting position and a length (but may be specified as a starting and an ending position, in an alternative embodiment), where the positions are specified as integer values. The integers are preferably separated by commas, and use zero-based counting. If a node has no data, as in the case of the node at 402 in the example, then this final entry is left empty. The node at 410 has a single-character data value in this example, and thus the final entry in this node's node specification is "8,1". As shown by the example syntax in FIG. 4C, the attribute names and values are preferably intermingled in the mXML data buffer along with the data content of the nodes.

Finally, the node specification for the last node (the node at 422, in the example of FIG. 4C) is immediately followed by the contents of the data buffer. Because integer pointer values specify where each data item begins in this data buffer and its length, as described above, it is not necessary to use white space or other delimiters in the data buffer.

Rather than specifying starting locations in terms of their offset from the start of the data buffer, they may alternatively be specified as offsets from the start of the mXML document. This approach requires slightly more space, however, and requires that the data buffer offsets are recomputed each time the structural information increases or decreases in length.

Thus, it can be seen that the structure of an mXML document is explicitly specified within the document. This information can be used to build a Document Object Model ("DOM") tree, if desired. The DOM tree can then be processed as in the prior art. Alternatively, the mXML document notation can be traversed directly, for example to locate information about a particular node, to determine the overall structure of the document, or to otherwise operate upon the mXML document. The mXML document may be stored using the array-based extensible document storage format described in U.S. Pat. No. 6,938,204, titled "Array-Based Extensible Document Storage Format" (application Ser. No. 09/652,296), filed Aug. 31, 2000, resulting in further processing efficiencies (as described therein) when operating on a document. (DOM is published as a Recommendation of the World Wide Web Consortium ("W3C"), titled "Document Object Model (DOM) Level 1 Specification, Version 1.0" (1998) and available on the Web at http://www.w3.org/TR/REC-DOM-Level-1. "DOM" is a trademark of Massachusetts Institute of Technology.)

As examples of operations that may be performed directly on an mXML document, or from its array-based representation, it may be necessary to determine a node's children or perhaps its parent. The technique for explicitly specifying each node's children using a child list within an mXML document has been described above. A node's parent can be easily determined by traversing the child lists using the target node's sequence number. Suppose, for example, that it is necessary to determine the parent of the node at 414. This node is the fourth node encountered in the node specifications of FIG. 4C, which corresponds to sequence number 3 when using zero-based counting. By locating the node specification which includes this sequence number in its child list, it can be seen that the node at 410 is the parent of the node at 414 (and also that the node at 414 is the second of 2 children).

The XML notation includes a number of notational elements which are not strictly necessary for data-centered document specification. An XML subset referred to as "SML", for "Simple Markup Language", is currently under discussion in the technical community. This XML subset proposes use of a core set of XML syntax, and omission of features including attributes, processing instructions, etc. See, for example, a Web-published article entitled "SML: Simplifying XML", which is written by Robert E. La Quey and is located at http://www.xml.com/pub/1999/11/sml/index.html (published Nov. 24, 1999). The preferred mXML syntax which is described herein provides support for one core set of XML notational elements (although not identical to the core set proposed for SML), where the basic node types include elements and attributes. More complicated XML documents containing additional node types can be supported by extending this preferred mXML syntax, where those additional node types include comments, processing instructions, CDATA, entity, entity reference, and document type nodes. In a preferred technique for specifying this extended mXML syntax, "text" nodes are added to an mXML document to refer to the actual node content. A node specification for a node type such as those just listed preferably occurs in-line within the mXML document, in the same relative location where it appears in a corresponding XML document. This node specification preferably comprises a null value in place of the node name; a list pointing to one or more child nodes, as is used in the node specifications which have been described, except that the children are now text nodes; an empty attribute list; and a pair of special indicators as the node value specification. The starting position entry within the special indicator pair is used to denote which type of other node is being represented. For example, a value of −2 may represent a comment, while a value of −3 represents a processing instruction, and so forth. The length entry within the special indicator pair is preferably set to −1. The node specification for each of the child text nodes referenced from the special child list preferably also uses a null name, and a null child list and attribute list. The value entry in this child text node then (1) points to a location within the data buffer where the node's content is stored (preferably as a character string representing all the significant content from the source node), and (2) stores the length of this content.

Furthermore, the SML syntax can be represented using an alternative embodiment wherein the attribute information described for the preferred embodiment of mXML is omitted.

Converting XML Documents to mXML Documents

There are at least 2 approaches that may be used to convert an XML document to an mXML document. In a first approach, a special parser may be written for this purpose, where the parser parses the XML syntax in a similar manner to existing XML parsers and then generates a corresponding document using mXML syntax. Using the teachings disclosed herein, it will be obvious how existing XML parsing techniques may be adapted for this purpose. (For example, a parser written in the Java programming language may be written to fire an event upon detecting the beginning and end of a node, an attribute name, an attribute value, etc., where programming code is written to handle those events by creating the appropriate mXML constructs.)

In a second approach, a preferred embodiment of which will now be described with reference to the logic in FIG. 5, a prior art XML parser is invoked to create a DOM tree. This DOM tree is then traversed, and the document information represented therein is then written out simply and efficiently, using mXML syntax.

Figure 5:
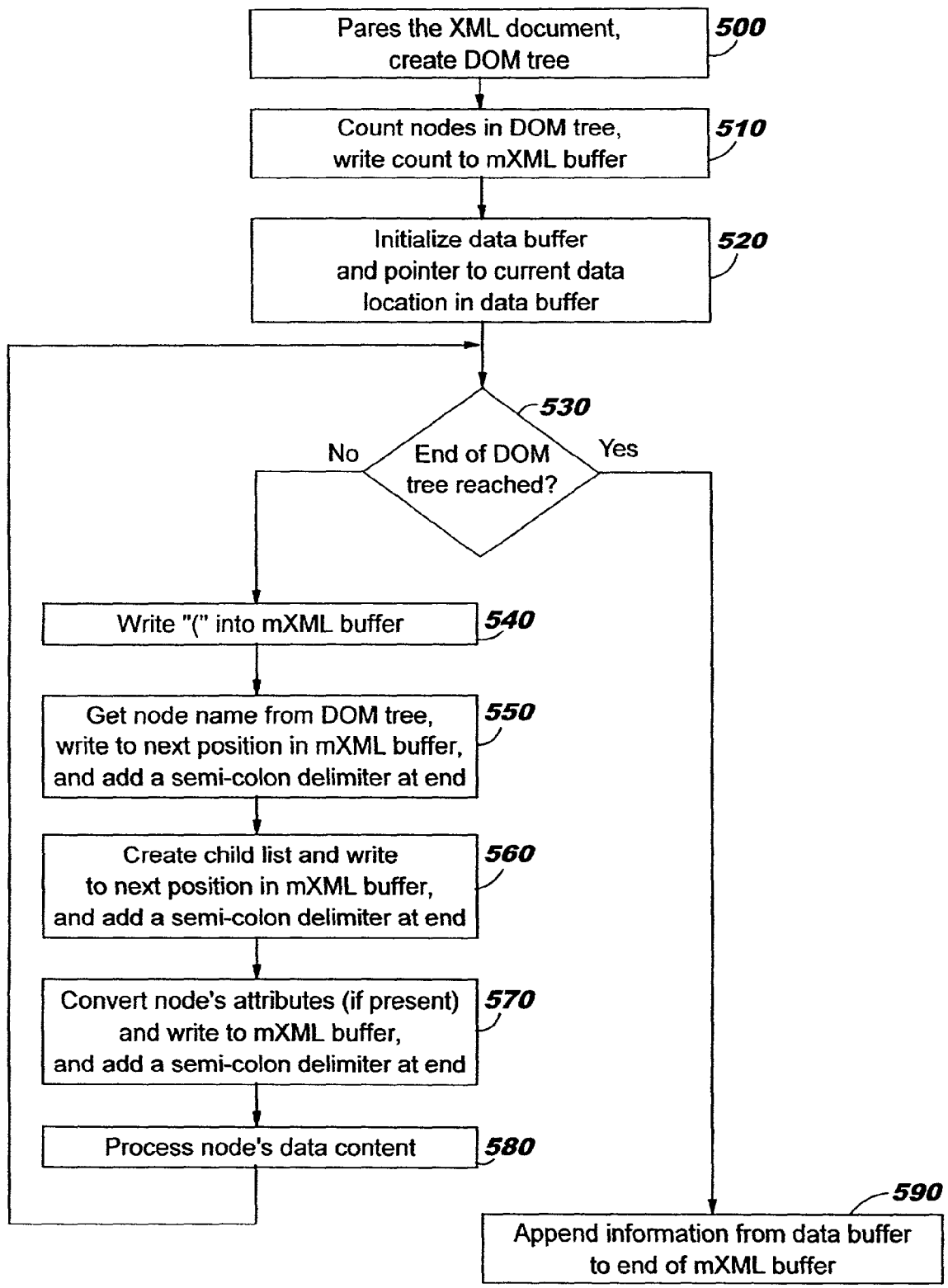
FIG. 5 provides a flowchart which sets forth logic for converting an XML document to an mXML document according to an exemplary embodiment of the present invention.

Referring now to FIG. 5, the conversion process begins at Block 500, where an XML parser of the prior art is used to parse the XML document and create a corresponding DOM tree. Block 510 then obtains a count of the nodes in this DOM tree, and writes this as an integer value into a buffer which is used to store the mXML document being created and will therefore be referred to as the "mXML buffer". A second buffer, referred to as the "data buffer", is then initialized, as is a counter that is used to point to a current location within this data buffer (Block 520).

The logic in Blocks 530 through 580 is then repeated as the DOM tree is traversed. Preferably, a depth-first traversal is used, to align with the ordering of nodes within the output mXML document as shown in FIG. 4C. Alternatively, the nodes in the output document may be created and specified therein in a breadth-first manner if desired.

While the end of the DOM tree has not been reached, the test in Block 630 has a negative result and processing therefore continues at Block 540; otherwise, control transfers to Block 590. At Block 540, the opening delimiter "(" is written into the mXML buffer to begin the node specification for the node currently being converted from XML to mXML. Block 550 then obtains the node's name from the DOM tree, and writes this into the next positions of the mXML buffer, followed by a semi-colon delimiter.

Block 560 creates the children list, and writes this to the next positions of the mXML buffer, again following the output characters with a semi-colon delimiter. If the DOM tree indicates that a node has no children, then only the delimiter is written out. Otherwise, the ordinality of the child nodes is determined, and the corresponding integer values for these nodes (preferably expressed in terms of zero-based counting) are written as a comma-separated list.

Block 570 converts the node's attribute information, if any, and writes this to the mXML buffer, followed by a semi-colon delimiter. For each attribute of the current node that is located in the DOM tree, the attribute's name and value are written to the data buffer in successive locations. The position within the data buffer where the name begins, and its length, are written to the mXML buffer as the first two dot-separated integers of the attribute specification. The data buffer counter that was initialized at Block 510 is then incremented by the length of the attribute name. Similarly, the position within the data buffer where the attribute value begins, and its length, are written to the mXML buffer using the dot-separated notation (and after a dot that follows the attribute name's length), and the data buffer counter is incremented by the length of the attribute value. If this node has more than one attribute, a comma is written to the mXML buffer to delimit the dot-separated attribute specifications.

After writing the semi-colon delimiter which marks the end of the attribute list, the node's data content is processed (Block 580). If the DOM tree indicates that the node has no data content, then a closing parenthesis delimiter is written to the mXML buffer and control returns to Block 530. Otherwise, the processing of Block 580 continues by writing the data content into the data buffer at the next available location. The starting position of this content is indicated by the current value of the data buffer counter. This value is therefore written to the mXML buffer, followed by a comma delimiter and the integer length of the content. The data buffer counter is incremented by this length, and the closing parenthesis is written to the mXML buffer. Control then transfers back to Block 530 to process the next node.

Processing reaches Block 590 when all the nodes in the DOM tree have been processed. The corresponding node specifications have been converted to mXML, and are stored in the mXML buffer. The attributes name and values, along with the data content for the nodes, are stored in the data buffer. Block 590 thus appends the information from the data buffer to the end of the mXML buffer. The mXML buffer now contains an mXML document such as that illustrated in FIG. 4C, corresponding to the input XML document such as that shown in FIG. 4A. This mXML document may now be processed, transmitted, or stored for later use as desired. (As an alternative to appending the contents of the data buffer to the mXML buffer, a pointer may be provided to convey this information. This may be useful, for example, if the conversion is performed as a prerequisite to transmitting the mXML document to another computer. In this case, the contents of the mXML buffer can be transmitted first, followed by the contents of the data buffer which are located using the pointer.)

Converting mXML Documents to XML Documents

Figure 6B:
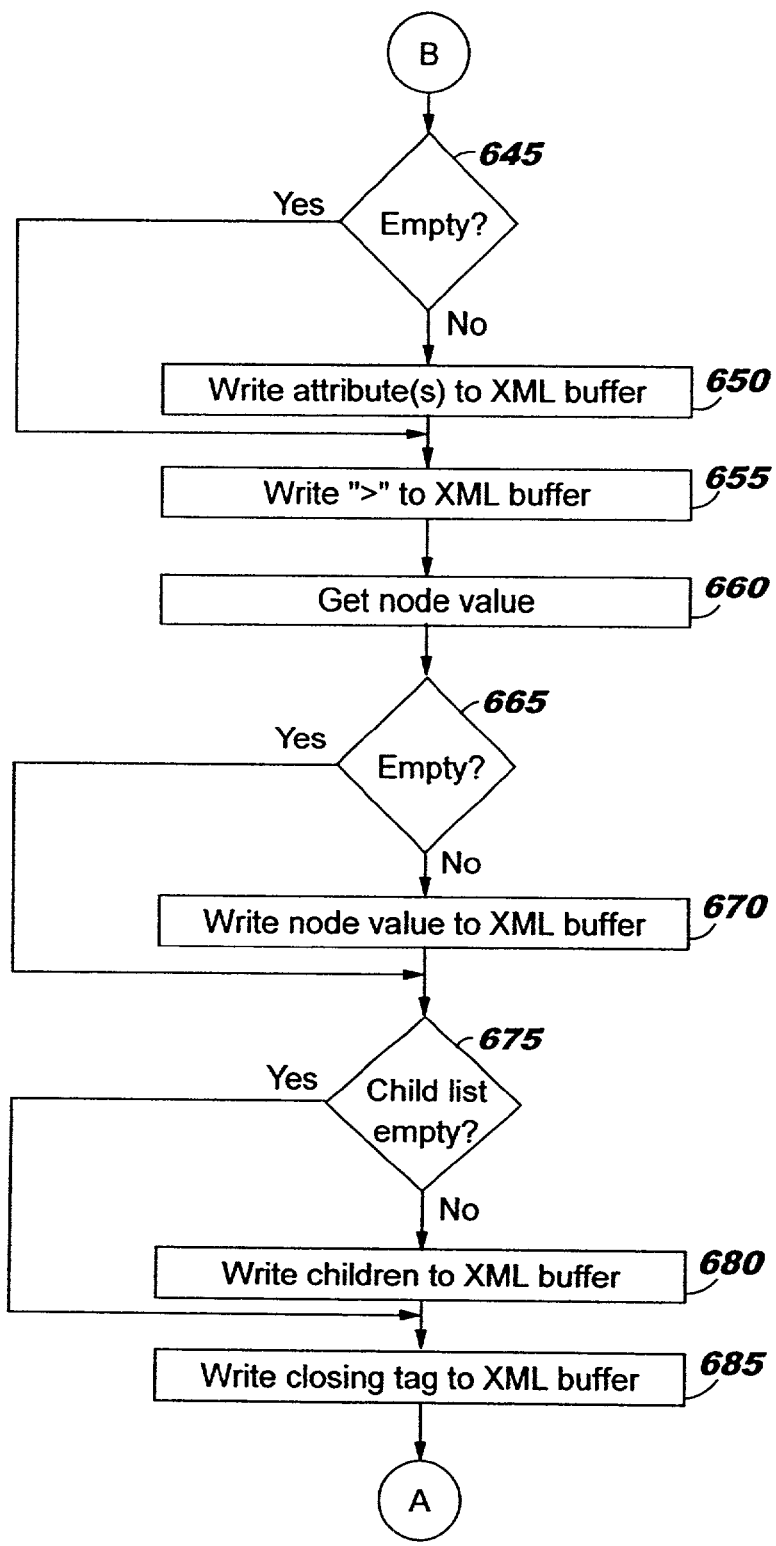
FIG. 6 provides a flowchart which sets forth logic for converting an mXML document to an XML document according to an exemplary embodiment of the present invention.

FIG. 6 provides a flowchart which sets forth the logic which may be used to convert an mXML document to an XML document, according to a preferred embodiment of the present invention. (Alternatively, an XML document may be composed by processing the mXML content represented in the array-based structure disclosed in U.S. Pat. No. 6,938, 204, titled "Array-Based Extensible Document Storage Format" (application Ser. No. 09/652,296), filed Aug. 31, 2000, and simply writing the XML document as these arrays are traversed. The manner in which this may be accomplished is straightforward.

The process of parsing an mXML document and generating its corresponding XML document begins at Block 600, by initializing a pointer to a buffer that will be used to construct the XML document and a data buffer pointer that points to the beginning of the mXML data buffer for the source document. Block 600 also initializes a node pointer that is used to keep track of which node specification is currently being processed from the source mXML document.

The logic of Blocks 605 through 685 is then iteratively performed to process the node specifications from the mXML document and create the corresponding XML representation thereof. (Preferably, this logic is implemented as re-entrant code which will be recursively invoked from Block 680, as discussed below.)

Block 605 obtains the next node specification from the mXML document, which is found by scanning to the next opening parenthesis delimiter, and sets the node pointer to point to this specification. Block 610 tests to see if the processing is complete (i.e. if there are no more node specifications). When this test has a positive response, the XML document is complete and control transfers to Block 690. At Block 690, the XML document may be processed according to the needs of a particular implementation. For example, if an in-memory buffer has been used to store the converted document, the buffer contents are preferably written to a persistent storage medium. The processing of FIG. 6 then ends.

Control reaches Block 615 when there is another node specification in the mXML document to be processed. Block 615 obtains the node name from this node specification, beginning from the position following the opening parenthesis delimiter to the position preceding the first semi-colon delimiter (Block 615). Block 620 writes an opening XML tag delimiter "<" to the current position in the XML buffer, followed by this node name, and moves the XML buffer pointer accordingly (i.e. to the next position in the XML buffer).

Block 625 then obtains the children list by scanning until reaching the next-successive semi-colon delimiter. Block 630 asks whether the children list is empty. If so, control transfers to Block 640. Otherwise, the index values of the child nodes from the list in the mXML document are saved. (Alternatively, the processing of Blocks 625 through 635 may be omitted from this point in the processing by scanning directly to the attribute list after operation of Block 620. In this case, the children list is preferably obtained immediately prior to operation of Block 675, by scanning backward in the node specification, thereby avoiding the need to store the index values for later use and to perform 2 tests as to whether this list is empty.)

The attribute list is obtained from the node specification at Block 640. The list is checked (Block 645) to see if it is empty. If not, Block 650 writes the information for each attribute into the XML buffer and moves the buffer pointer.

Writing each attribute's information preferably comprises writing a blank space to follow the node name written out in Block 620. This blank space is then followed by the attribute name, where the attribute name is found using the starting position and length from the attribute list along with the data buffer pointer to index into the mXML data buffer, and then (i) an optional blank space, (ii) an equal sign, (iii) another optional blank space, and (iv) an opening quotation mark. The attribute value is then obtained from the mXML data buffer using the starting position and length from the attribute list, along with the data buffer pointer. This attribute value is then written to the XML data buffer, followed by a closing quotation mark. This process is repeated for each attribute in the attribute list (where each attribute name/value pair is preferably separated from the preceding pair using a blank space), after which processing continues at Block 655. (While the preferred embodiment is described in terms of separating output tokens in the XML document using blank spaces, it will be obvious than other separators may be used equivalently, such as multiple blank spaces and/or tab character(s) and/or line return(s).)

Block 655 writes a closing tag delimiter ">" to the XML output buffer. Block 660 then obtains the node's value information from the mXML document. If there was none, the test in Block 665 has a negative result, and the processing of Block 670 is bypassed. Otherwise, Block 670 uses the starting position and length from the node specification, along with the mXML data buffer pointer, to obtain the actual node value and writes this value to the next position(s) in the XML output buffer.

Block 675 then tests whether the previously-stored list of child nodes (from Block 635) is empty. If not, Block 680 writes the child nodes to the XML buffer. Preferably, this is performed by recursively invoking the logic of Blocks 605 through 685 for each child node, where this child node's specification is obtained at Block 605 using a simple in-order traversal through the mXML document.

Upon reaching Block 685, all children of the current node have been processed. Block 685 then writes a closing tag, which has the syntax "</" followed by the node name determined in Block 615 followed by ">", to the XML buffer. Control then returns to Block 605 to process the next node specification.

Parsing an mXML Document

Figure 7:
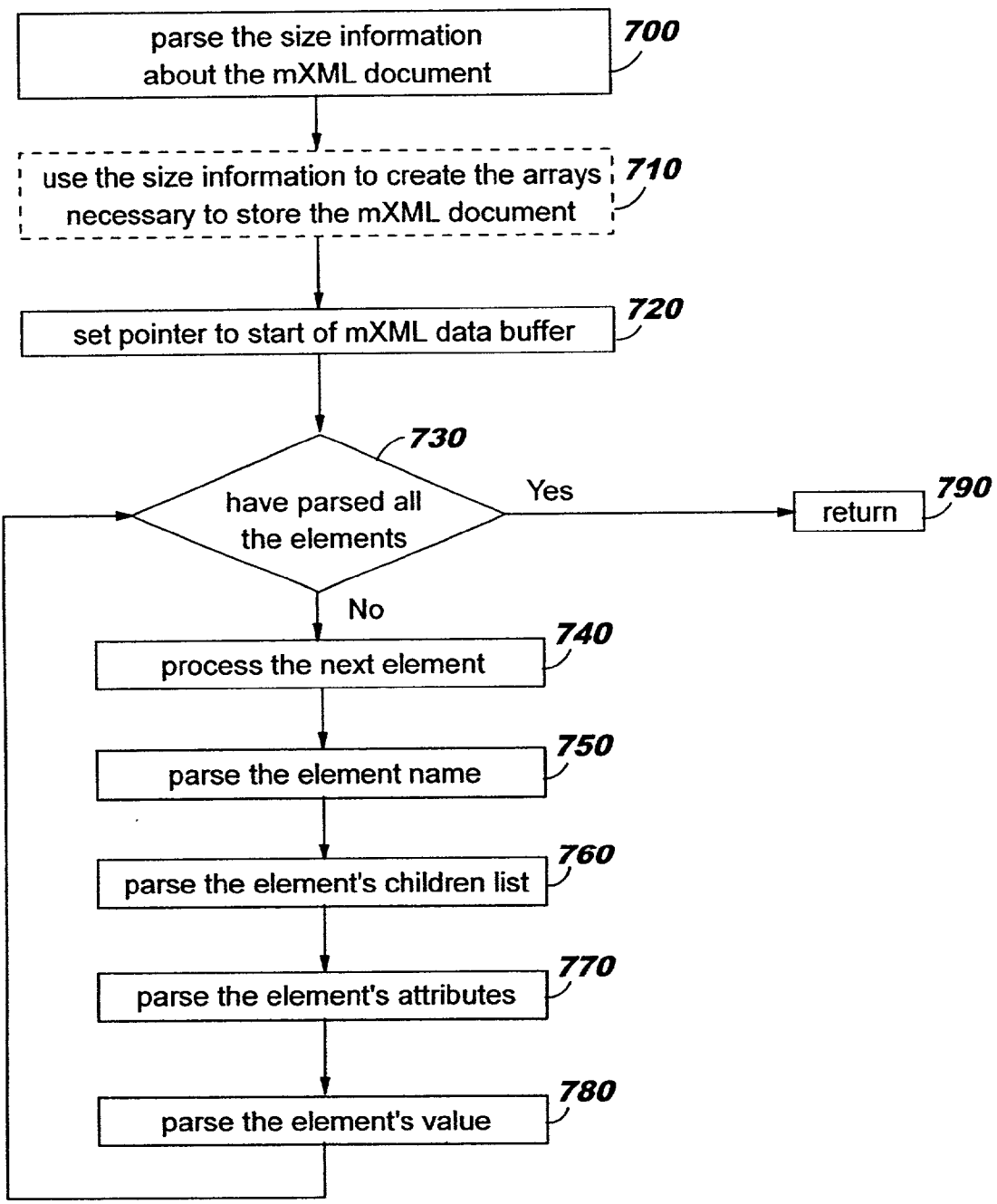
FIG. 7 provides a flowchart which sets forth logic for parsing an mXML document according to an exemplary embodiment of the present invention.

FIG. 7 provides a flowchart which sets forth a preferred embodiment of the logic which may be used to parse an mXML document which uses the preferred mXML syntax, according to the present invention. This process begins at Block 700, where the size information (i.e. the number of nodes) for the document is determined by scanning the input. This size information is found as the first token of the mXML document, and will be an integer value. If the mXML document is to be stored using the array-based representation disclosed in the U.S. Pat. No. 6,938,204, titled "Array-Based Extensible Document Storage Format" (application Ser. No. 09/652,296), filed Aug. 31, 2000, then this size information is used to create arrays at Block 710.

Block 720 then determines where the data buffer of the mXML document begins. Preferably, this comprises scanning the document in reverse order, from the end of the document content until locating the first (that is, the last-occurring) closing parenthesis (or other delimiter that may be substituted for closing a node specification, if parentheses are not used for this purpose). As is well known in the art, there may be occasions when a symbol defined for use as a delimiter needs to be used simply as a character of data. An escape character may be defined to enable representing delimiters as their normal character value. Thus, this scan preferably accounts for this situation, and locates the first non-escaped closing parenthesis. The data buffer then begins at the next-sequential position of the mXML document, as illustrated at 480 in FIG. 4C. (Accounting for escaped characters will not be further discussed with reference to FIG. 7. One of skill in the art will readily understand how this processing is to be handled.)

Alternatively, when the location of the data buffer and/or the size of the data buffer is explicitly specified in the mXML document, as discussed earlier, the processing of Block 720 comprises simply using the pre-stored information.

The test in Block 730 asks whether all the elements in the document have been parsed. This test has a positive result when the next character is not an opening node specification delimiter (i.e. an opening parenthesis, in the preferred embodiment). In this case, the parsing process of FIG. 7 is complete, and control returns to the invoking logic as shown at Block 790.

When the elements in the document have not been completely parsed, the test in Block 730 has a negative result and processing continues at Block 740. As indicated therein, the next element (that is, the next node) is to be parsed. This comprises positioning past the opening parenthesis for the node specification. Block 750 then parses the node's name from the mXML document. In the preferred embodiment syntax, this comprises reading the characters until encountering a semi-colon delimiter. These characters then represent the node's name, and may be stored or otherwise used.

Block 760 parses the node's children list. The children list begins with the character after the semi-colon delimiter which follows the node's name, and continues up to the next semi-colon delimiter. If the child list contains a comma, this indicates that there are multiple child nodes. (If desired, the node specifications of the nodes in this children list may be parsed at this point by using the child's node number from the children list to position to the child's node specification and then recursively invoking the logic in Blocks 740 through 780, where a suitable alternative "at end" test is then used in Block 730.)

Block 770 parses the node's attribute list. This attribute list follows the semi-colon delimiter used to end the children list, and continues up to the next semi-colon delimiter. The names and values of these attributes may be retrieved from the data buffer, if desired, using the data buffer starting position that was determined in Block 720 along with the individual starting and length values specified as integers within the dotted notation used for the attribute list. If a comma is detected following the 4 integers in the dotted notation, this indicates the presence of an additional attribute that is then processed in the same manner.

Block 780 then locates the node's value. This comprises obtaining the starting position and length values which follow the final semi-colon delimiter in the node specification, and which are separated from one another with a comma delimiter. As with the attribute names and values in Block 770, the node value may be retrieved from the data buffer using the pointer to the data buffer along with the node name's starting and length values.

Control then returns to Block 730 to determine whether there are more node specifications to be parsed.

Workstation/Device

Figure 8:
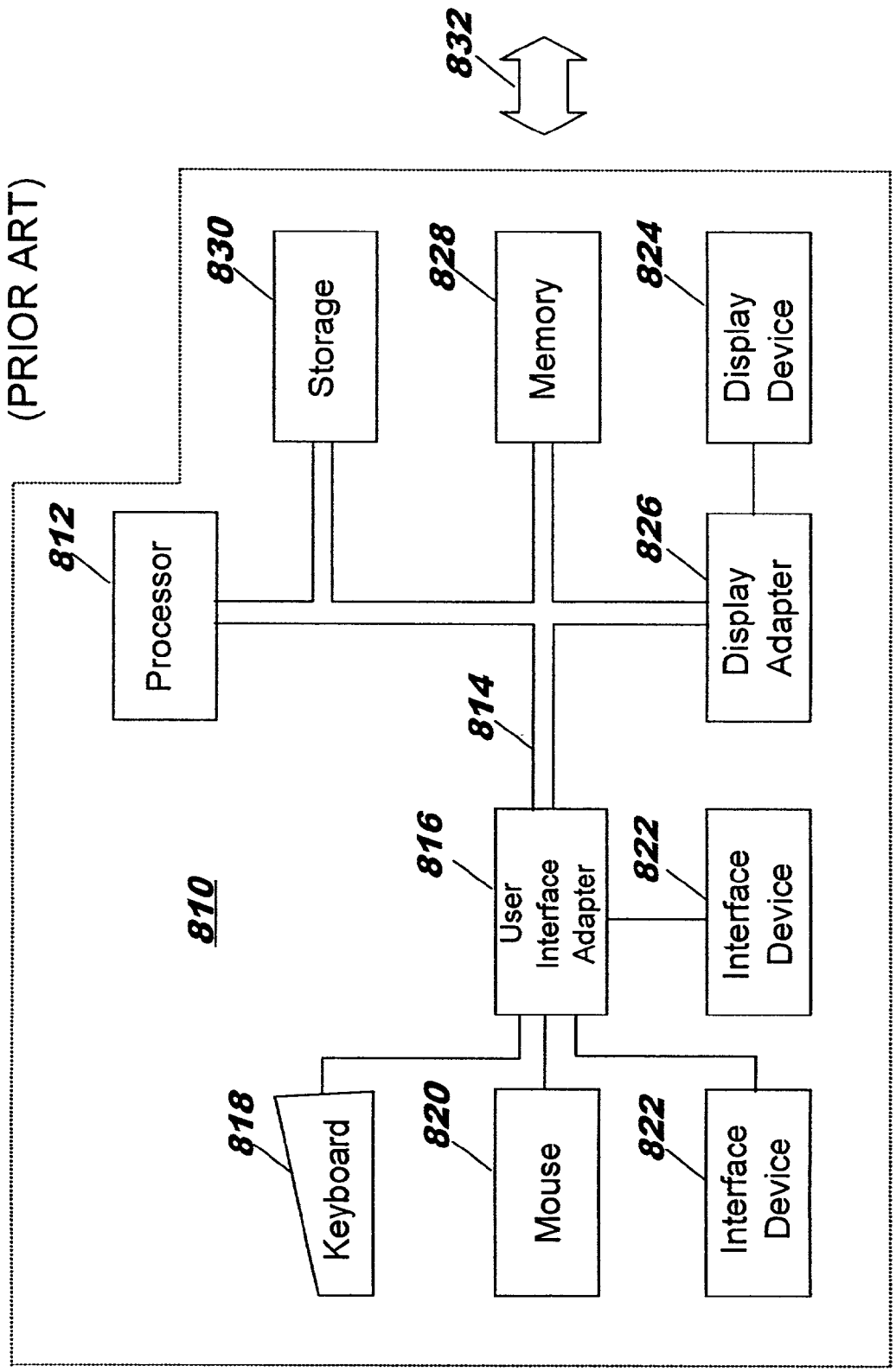
FIG. 8 is a block diagram of a computer workstation environment in which the present invention may be practiced.

FIG. 8 is illustrative of a computer system in which the present invention may be practiced. The hardware of the workstation of FIG. 8 is of a type well known in the art. The environment of FIG. 8 comprises a representative single user computer workstation 810, such as a personal computer, including related peripheral devices. The workstation 810 includes a microprocessor 812 and a bus 814 employed to connect and enable communication between the microprocessor 812 and the components of the workstation 810 in accordance with known techniques. The workstation 810 typically includes a user interface adapter 816, which connects the microprocessor 812 via the bus 814 to one or more interface devices, such as a keyboard 818, mouse 820, and/or other interface devices 822, which can be any user interface device, such as a touch sensitive screen, digitized entry pad, etc. The bus 814 also connects a display device 824, such as an LCD screen or monitor, to the microprocessor 812 via a display adapter 826. The bus 814 also connects the microprocessor 812 to memory 828 and long-term storage 830 which can include a hard drive, diskette drive, tape drive, etc.

The workstation 810 may communicate with other computers or networks of computers, for example via a communications channel or modem 832. Alternatively, the workstation 810 may communicate using a wireless interface at 832, such as a CDPD (cellular digital packet data) card. The workstation 810 may be associated with such other computers in a LAN or a wide area network (WAN), or the workstation 810 can be a client in a client/server arrangement with another computer, etc. All of these configurations, as well as the appropriate communications hardware and software, are known in the art.

The present invention may operate on a server or mainframe (referred to hereinafter as a server, for ease of reference), rather than on a workstation. The hardware environment of a server is well known in the art. Or, the present invention may operate on other computing devices such as personal digital assistants (PDAs), portable computing devices, etc. The documents created through use of the present invention may be stored on permanent or removable storage media used by a computing device, and/or may be transmitted between such a device and a server, or between a server and another server, where these types of devices may be connected by a network.

In the preferred embodiment, the present invention is implemented in computer software. The implementation of this software may operate as one or more modules (also referred to as code subroutines, or "objects" in object-oriented programming) of one or more computer programs.

Similarly, the present invention may be implemented in computer software and/or hardware for execution by a network device such as a router, switch, load balancer, proxy, TCP shaper, etc.

Network

Figure 9:
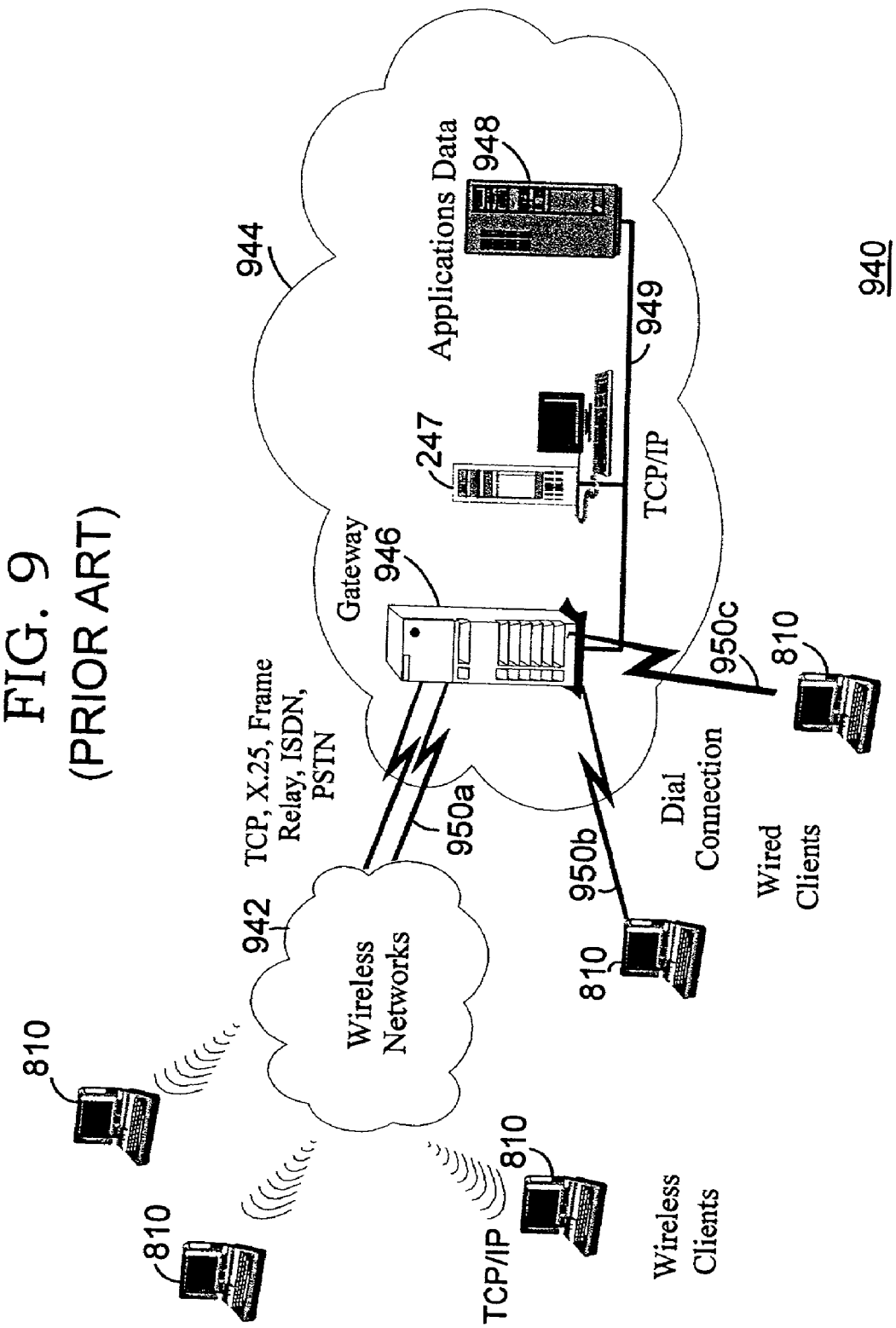
FIG. 9 is a diagram of a networked computing environment in which the present invention may be practiced.

FIG. 9 illustrates an exemplary data processing network 940 in which the present invention may be practiced. The data processing network 940 may include a plurality of individual networks, such as wireless network 942 and network 944, each of which may include a plurality of individual workstations 810. Additionally, as those skilled in the art will appreciate, one or more LANs may be included (not shown), where a LAN may comprise a plurality of intelligent workstations coupled to a host processor.

Still referring to FIG. 9, the networks 942 and 944 may also include mainframe computers or servers, such as a gateway computer 946 or application server 947 (which may access a data repository 948). A gateway computer 946 serves as a point of entry into each network 944. The gateway 946 may be preferably coupled to another network 942 by means of a communications link 950*a*. The gateway 946 may also be directly coupled to one or more workstations 810 using a communications link 950*b*, 950*c*. The gateway computer 946 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.) These are merely representative types of computers with which the present invention may be used.

The gateway computer 946 may also be coupled 949 to a storage device (such as data repository 948). Further, the gateway 946 may be directly or indirectly coupled to one or more workstations 810, and servers such as gateway 946 and application server 947 may be coupled to other servers such as server 943.

Those skilled in the art will appreciate that the gateway computer 946 may be located a great geographic distance from the network 942, and similarly, the workstations 910 may be located a substantial distance from the networks 942 and 944. For example, the network 942 may be located in California, while the gateway 946 may be located in Texas, and one or more of the workstations 810 may be located in New York. The workstations 810 may connect to the wireless network 942 using a networking protocol such as the Transmission Control Protocol/Internet Protocol ("TCP/IP") over a number of alternative connection media, such as cellular phone, radio frequency networks, satellite networks, etc. The wireless network 942 preferably connects to the gateway 946 using a network connection 950*a* such as TCP or UDP (User Datagram Protocol) over IP, X.25, Frame Relay, ISDN (Integrated Services Digital Network), PSTN (Public Switched Telephone Network), etc. The workstations 810 may alternatively connect directly to the gateway 946 using dial connections 950*b* or 950*c*. Further, the wireless network 942 and network 944 may connect to one or more other networks (not shown), in an analogous manner to that depicted in FIG. 3.

Software programming code which embodies the present invention is typically accessed by the microprocessor 912 (for example, of the workstation 810, server 948, gateway 946, and/or server 947) from long-term storage media 830 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 828, and accessed by the microprocessor 812 using the bus 814. The techniques and methods for embodying software programming code in memory, on physical media, and/or distributing software code via networks are well known and will not be further discussed herein.

The present invention may be used on a client computer or server in a networking environment, or on a standalone workstation (for example, to prepare a file or to process a file which has been received over a network connection, via a removable storage medium, etc.). (Note that references herein to client and server devices are for purposes of illustration and not of limitation: the present invention may also be used advantageously with other networking models.) When used in a networking environment, the client and server devices may be connected using a "wireline" connection or a "wireless" connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The workstation or client computer may be any type of computer processor, including laptop, handheld or mobile computers; vehicle-mounted devices; desktop computers; mainframe computers; etc., having processing (and, optionally, communication) capabilities. The server, similarly, can be one of any number of different types of computer which have processing and communication capabilities. These techniques are well known in the art, and the hardware devices and software which enable their use are readily available.

Similarly, the present invention may be implemented in computer software and/or hardware for execution by a network device such as a router, switch, load balancer, proxy, TCP shaper, etc. within a network, e.g. 942, 944.

While the preferred embodiment of the present invention has been described, additional variations and modifications in that embodiment may occur to those skilled in the art once they learn of the basic inventive concepts. In particular, the preferred embodiment may be adapted to changes in the XML notation, should they occur, and the inventive concepts disclosed herein may also be adapted for use with other notations that are syntactically similar to XML. Therefore, it is intended that the appended claims shall be construed to include both the preferred embodiment and all such variations and modifications as fall within the spirit and scope of the invention.

What is claimed is:

1. A method for processing an input document encoded in an extensible markup language ("XML"), said method comprising:
    converting said input document encoded in XML to an output document encoded in a machine-oriented extensible markup language ("mXML"), said output document encoded in mXML comprising fewer characters than said input document encoded in XML;
    processing said output document encoded in mXML;
    identifying a target to which the processed output document encoded in mXML will be next routed; and
    determining whether said target is capable of processing documents encoded in mXML;
    if said target is determined to be capable of processing documents encoded in mXML, transmitting the processed output document encoded in mXML to said target; and
    if said target is determined to be not capable of processing documents encoded in mXML, converting the processed output document encoded in mXML to an output document encoded in XML, and transmitting said output document encoded in XML to said target.

2. The method of claim 1, wherein said identifying comprises parsing the processed output document.

3. The method of claim 2, wherein said identifying comprises identifying a host name string for routing of the processed output document.

4. The method of claim 1, wherein said determining comprises referencing a datastore, said datastore storing data identifying a plurality of targets and indicating whether each of said plurality of targets is capable of processing documents encoded in mXML.

5. The method of claim 1, wherein said converting comprises:
    creating a document tree representation of the input document;
    obtaining a node count representing a count of nodes in the document tree representation;
    writing the node count to an mXML buffer;
    traversing each node in the document tree representation and generating a corresponding node specification in the mXML buffer, further comprising the steps of:
        generating a node name;
        generating an attribute list specifying zero or more (attribute name, attribute value) pair references for attributes of the node;
        generating a child list specifying index values of zero or more nodes which are children of the node; and
        generating a node value specification, which is empty if the node has no value;
    generating a data buffer containing attribute names and attribute values referenced from the attribute lists and node values referenced from the node value specifications; and
    appending the data buffer to the mXML buffer to form the output document.

6. The method of claim 1, wherein said processing comprises: parsing said output document.

7. The method of claim 6, wherein: said parsing of said output document comprises extracting routing data from said output document.

8. The method of claim 1, wherein said processing comprises:
    processing said output document for content based routing if said target is determined to be capable of processing documents encoded in mXML.

9. The method of claim 1, further comprising:
processing the converted output document encoded in XML.

10. The method of claim 9, wherein processing the converted output document encoded in XML comprises transmitting the converted output document encoded in XML to said target.

11. The method of claim 6, wherein processing said output document encoded in mXML comprises:
parsing a node count representing a count of nodes in the document;
parsing a node specification for each of the nodes, further comprising the steps of:
parsing a node name;
parsing a child list specifying index values of zero or more nodes which are children of the node;
parsing an attribute list specifying zero or more (attribute name, attribute value) pair references for attributes of the node; and
parsing a node value specification, which is empty if the node has no value; and
parsing a data buffer containing attribute names and attribute values referenced from the attribute lists and node values referenced from the node value specifications.

12. A method for processing an input document encoded in a machine-oriented extensible markup language ("mXML"), said method comprising:
determining whether said input document will be next routed to a target which is capable of processing documents encoded in mXML;
converting said input document encoded in mXML to an output document encoded in a extensible markup language ("XML") if said target is determined to be not capable of processing documents encoded in mXML, said output document encoded in XML comprising a non-printing character not included in said input document encoded in mXML; and
processing said output document encoded in XML.

13. The method of claim 12, wherein said determining comprises:
identifying a target to which said input document will be next routed; and
determining whether said target is capable of processing documents encoded in mXML.

14. The method of claim 13, wherein determining whether said target is capable of processing documents encoded in mXML comprises referencing a datastore, said datastore storing data identifying a plurality of targets and indicating whether each of said plurality of targets is capable of processing documents encoded in mXML.

15. The method of claim 12, wherein said converting comprises:
identifying a document tree representation of the input document;
reading a node count from an mXML buffer;
traversing each node in the document tree representation and generating a corresponding node specification in the mXML buffer, further comprising the steps of:
identifying a node name;
identifying an attribute list specifying zero or more (attribute name, attribute value) pair references for attributes of the node;
identifying a child list specifying index values of zero or more nodes which are children of the node; and
identifying a node value specification, which is empty if the node has no value;

generating a data buffer containing attribute names and attribute values referenced from the attribute lists and node values referenced from the node value specifications; and
appending me data buffer to the XML buffer to form the output document.

16. The method of claim 12, further comprising: processing said input document encoded in mXML.

17. The method of claim 16, wherein processing said input document encoded in mXML comprises parsing said input document encoded in mXML.

18. The method of claim 12, wherein determining whether said input document will be next routed to a target which is capable of processing documents encoded in mXML comprises transmitting said output documents encoded in XML.

19. A computer program product embodied on one or more computer-readable media, the computer program product adapted for processing an input document encoded in an extensible markup language ("XML") and comprising:
computer-readable program code configured to convert said input document encoded in XML to an output document encoded in a machine-oriented extensible markup language ("mXML");
computer-readable program code configured to process said output document;
computer-readable program code configured to identify a target to which the processed output document will be next routed;
computer-readable program code configured to determine whether said target is capable of processing documents encoded in mXML, and if so, to convert said input document to said output document; and
computer-readable program code configured to transmit one of said input document and said output document to said target.

20. The computer program product of claim 19, wherein said computer-readable program code configured to convert said input document encoded in XML to an output document encoded in mXML comprises:
computer-readable program code configured to create a document tree representation of the input document;
computer-readable program code configured to obtain a node count representing a count of nodes in the document tree representation;
computer-readable program code configured to write the node count to an mXML buffer;
computer-readable program code configured to traverse each node in the document tree representation and generating a corresponding node specification in the mXML buffer, further comprising:
computer-readable program code configured to generate a node name;
computer-readable program code configured to generate an attribute list specifying zero or more (attribute name, attribute value) pair references for attributes of the node;
computer-readable program code configured to generate a child list specifying index values of zero or more nodes which are children of the node; and
computer-readable program code configured to generate a node value specification, which is empty if the node has no value;
computer-readable program code configured to generate a data buffer containing attribute names and attribute values referenced from the attribute lists and node values referenced from the node value specifications; and computer-readable program code configured to append the data buffer to the mXML buffer to form the output document.

21. The computer program product of claim 19, wherein said computer-readable program code configured to process said output document comprises computer-readable program code for processing a document encoded in mXML comprising:
- computer-readable program code configured to parse the document, further comprising:
  - computer-readable program code configured to parse a node count representing a count of nodes in the document;
  - computer-readable program code configured to parse a node specification for each of the nodes, further comprising:
    - computer-readable program code configured to parse a node name;
    - computer-readable program code configured to parse a child list specifying index values of zero or more nodes which are children of the node;
    - computer-readable program code configured to parse an attribute list specifying zero or more (attribute name, attribute value) pair references for attributes of the node; and
    - computer-readable program code configured to parse a node value specification, which is empty if the node has no value; and
  - computer-readable program code configured to parse a data buffer containing attribute names and attribute values referenced from the attribute lists and node values referenced from the node value specifications; and
- computer-readable program code configured to use the parsed document as input for processing.

22. A system for processing an input document encoded in an extensible markup language ("XM"), said system comprising:
- means for converting said input document encoded in XML to an output document encoded in a machine-oriented extensible markup language ("mXML"), said output document encoded in mXML being compact relative to said input document encoded in XML yet conveying data and structure of said input document;
- means for processing said output document encoded in mXML;
- means for identifying a target to which the processed output document will be next routed;
- means for determining whether said target is capable of processing documents encoded in mXML; and
- means for transmitting one of said input document and said output document to said target.

23. The system of claim 22, wherein said means for converting said output document encoded in XML to an output document encoded in mXML comprises:
- means for creating a document tree representation of the input document;
- means for obtaining a node count representing a count of nodes in the document tree representation;
- means for writing the node count to an mXML buffer;
- means for traversing each node in the document tree representation and generating a corresponding node specification in the mXML buffer, further comprising:
  - means for generating a node name;
  - means for generating an attribute list specifying zero or more (attribute name, attribute value) pair references for attributes of the node;
  - means for generating a child list specifying index values of zero or more nodes which are children of the node; and
  - means for generating a node value specification, which is empty if the node has no value;
- means for generating a data buffer containing attribute names and attribute values referenced from the attribute lists and node values referenced from the node value specifications; and
- means for appending the data buffer to the mXML buffer to form me output document.

24. The system of claim 22, wherein said means for processing said output document in mXML comprises;
- means for parsing the document, further comprising:
  - means for parsing a node count representing a count of nodes in the document;
  - means for parsing a node specification for each of the nodes, further comprising:
    - means for parsing a node name;
    - means for parsing a child list specifying index values of zero or more nodes which are children of the node;
    - means for parsing an attribute list specifying zero or more (attribute name, attribute value) pair references for attributes of the node; and
    - means for parsing a node value specification, which is empty if the node has no value; and
  - means for parsing a data buffer containing attribute names and attribute values referenced from the attribute lists and node values referenced from the node value specifications; and
- means for using the parsed document as input for the processing.

25. A method for processing an input document comprising:
- determining whether said input document will be next routed to a target which is capable of processing documents encoded in a machine-oriented extensible markup language ("mXML");
- converting said input document to an output document encoded in an extensible markup language ("XML") if said input document is encoded in mXML and said target is not capable of processing documents encoded in mXML; and
- transmitting one of said input document and said output document to said target.

26. The method of claim 25, further comprising:
- converting an original document encoded in XML to an input document encoded in mXML and wherein converting an original document encoded in XML to an input document encoded in mXML occurs prior to determining whether said input document will be next routed to a target which is capable of processing documents encoded in a machine-oriented extensible markup language ("mXML"), said input document encoded in mXML being capable of being processed more efficiently than said input document.

27. The method of claim 26, wherein said determining comprises:
- identifying a target to which said input document will be next routed;
- determining whether said target is capable of processing documents encoded in mXML.

28. The method of claim 27, wherein said identifying comprises parsing said input document.

29. The method of claim 28, wherein said determining comprises referencing a datastore, said datastore storing date identifying a plurality of targets and indicating whether each of said plurality of targets is capable of processing documents encoded in mXML.

30. The method of claim 1, wherein said input document encoded in XML comprises a plurality of non-printing characters, and wherein said output document encoded in mXML does not comprise said plurality of non-printing characters.

* * * * *